US008622542B2

(12) United States Patent
Takahashi

(10) Patent No.: US 8,622,542 B2
(45) Date of Patent: Jan. 7, 2014

(54) IMAGE DISPLAY APPARATUS

(75) Inventor: Koichi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 281 days.

(21) Appl. No.: 13/187,847

(22) Filed: Jul. 21, 2011

(65) Prior Publication Data

US 2012/0026455 A1   Feb. 2, 2012

(30) Foreign Application Priority Data

Jul. 27, 2010   (JP) ................................. 2010-167791

(51) Int. Cl.
  *G02C 1/00*   (2006.01)
  *G02B 27/14*   (2006.01)
(52) U.S. Cl.
  USPC ............................... 351/158; 359/630; 345/8
(58) Field of Classification Search
  USPC ............ 351/158, 41, 111, 121; 359/630, 631, 359/633, 638; 345/8, 7
  See application file for complete search history.

(56) References Cited

U.S. PATENT DOCUMENTS

| 5,886,822 A | 3/1999 | Spitzer |
| 6,023,372 A | 2/2000 | Spitzer et al. |
| 7,158,096 B1 * | 1/2007 | Spitzer .............................. 345/8 |
| 8,092,011 B2 * | 1/2012 | Sugihara et al. .............. 351/158 |

FOREIGN PATENT DOCUMENTS

| JP | 2000-249968 A | 9/2000 |
| JP | 2003-149590 A | 5/2003 |
| JP | 3429320 | 5/2003 |
| JP | 2004-021078 A | 1/2004 |
| JP | 2006-003879 | 1/2006 |
| JP | 2006-209144 | 8/2006 |
| JP | 3871188 | 10/2006 |
| JP | 2008-158203 A | 7/2008 |
| JP | 2008-310342 A | 12/2008 |

* cited by examiner

*Primary Examiner* — Hung Dang
(74) *Attorney, Agent, or Firm* — Scully, Scott, Murphy & Presser, P.C.

(57) ABSTRACT

The image display apparatus of the invention comprises a prism optical system using at least two optical surfaces, each having an optical function. At least two surfaces of the two optical surfaces are rotationally asymmetric surfaces, and one of the two surfaces which light transmits or leaves has a function of one transmission and two internal reflections.

12 Claims, 24 Drawing Sheets

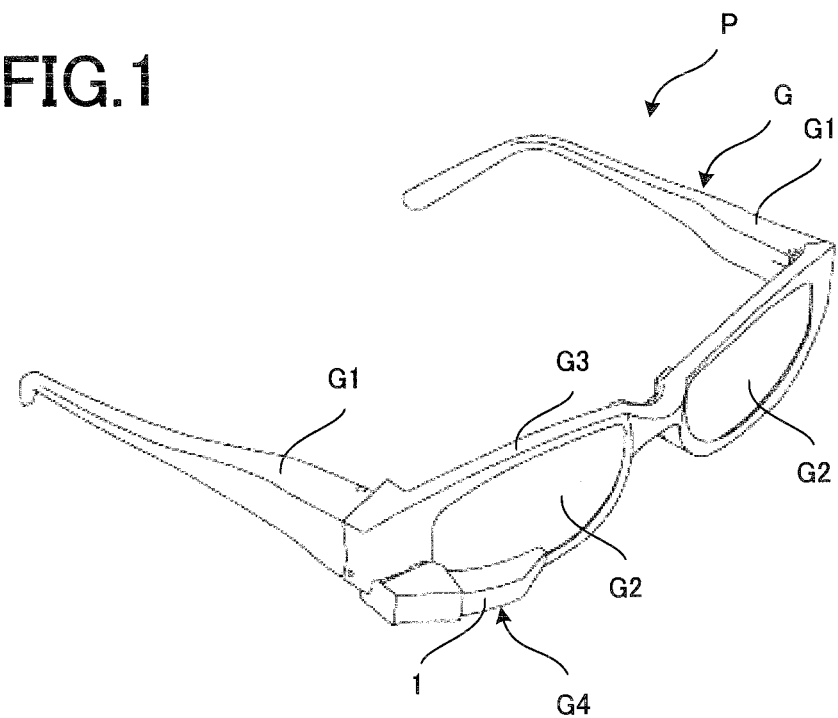
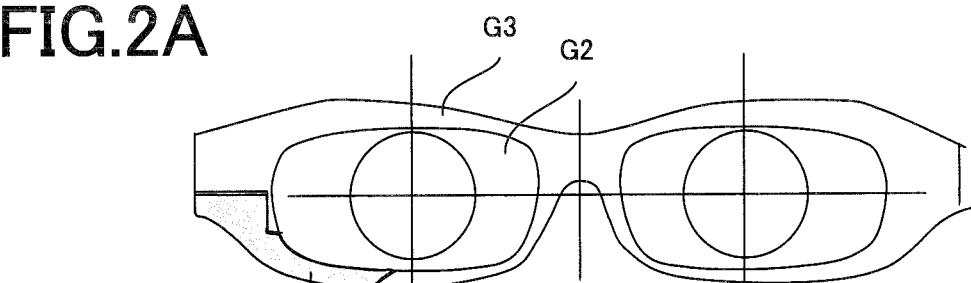
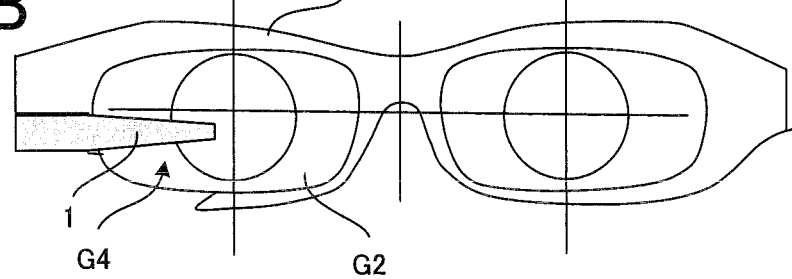

IMAGE DISPLAY APPARATUS

BACKGROUND OF THE INVENTION

The present invention relates to a head-mounted type image display apparatus.

One conventional image display apparatus typically comprises an image display unit held on the temple side of eyeglasses and an eyepiece optical unit held on the lens side of eyeglasses, whereby image-bearing light leaving the image display unit is entered into the viewer s eyeball through the eyepiece optical unit so that it can be viewed in the form of an image. Prior arts in this regard, for instance, include an arrangement having a hologram device located on the lens segments of eyeglasses (see JP(A) 2006-209144).

There is another eyeglasses type image display apparatus proposed in the art, which is held on the frame or the like of eyeglasses and positioned on the outside of lenses or which has an optical path through the lenses of eyeglasses. See U.S. Pat. Nos. 3,871,188 and 3,429,320, and JP(A) 2006-003879.

SUMMARY OF THE INVENTION

One embodiment of the present invention provides an image display apparatus comprising an image display device for displaying an image and a viewing optical system for projecting the image onto a viewer s eyeball, wherein:

the viewing optical system is a prism that forms a part of eyeglasses, said prism being made up of at least two surfaces and including at least two rotationally asymmetric surfaces; and light leaving the image display device is reflected odd-numbered times within the prism before it is guided to the viewer s eyeball.

In one embodiment of the invention, of the at least two rotationally asymmetric surfaces, the first surface is located at a position in proximity to a viewer upon viewing, and the second surface is located at a position outside the viewer upon viewing.

In one embodiment of the invention, the second surface located outside the viewer upon viewing has positive power in the Y-Z plane.

In one embodiment of the invention, the exit surface of the viewing optical system for the viewer s eyeball is configured along the bottom shurface of eyeglass lenses.

In one embodiment of the invention, the light from the image display device is reflected five times within the prism in the viewing optical system, and then leaves the prism, arriving at the viewer s eyeball.

In one embodiment of the invention, the viewing optical system is a prism that is made up of at least two optical surfaces.

In one embodiment of the invention, the viewing optical system is a prism that is made up of at least three optical surfaces.

In one embodiment of the invention, the viewing optical system is a prism that is made up of at least four optical surfaces.

In one embodiment of the invention, the viewing optical system forms a primary image within the prism, and projects that primary image onto the viewer s eyeball.

In one embodiment of the invention, the viewing optical system has an exit pupil formed near an exit surface of the prism or between the exit surface and the viewer s eyeball.

In one embodiment of the invention, the viewing optical system is located in such a way as to form a part of the eyeglasses frame.

In one embodiment of the invention, the viewing image display device is located at an end face of the temple segment of eyeglasses and in opposition to an entrance surface of the viewing optical system for capturing an image.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

FIG. 1 is a perspective view of the whole of the eyeglasses type image display apparatus.

FIGS. 2A and 2B is a front view of the eyeglasses type image display apparatus.

DESCRIPTION OF EXEMPLARY EMBODIMENTS

Figure 3:
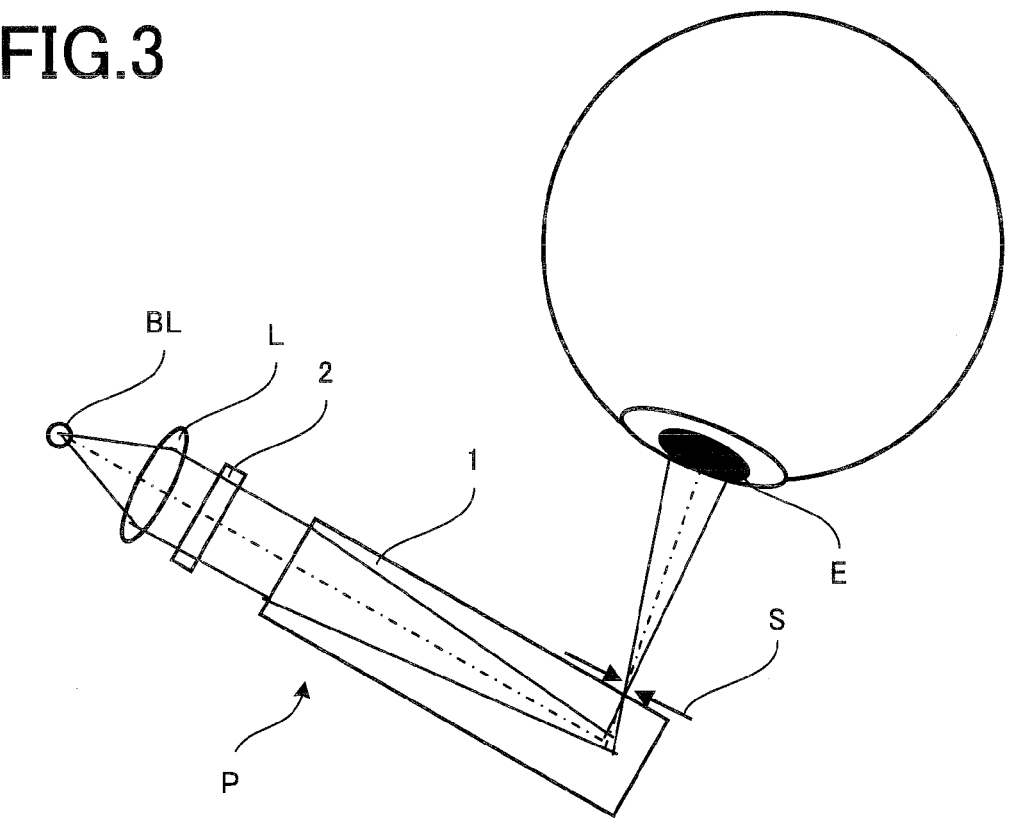
FIG. 3 is illustrative of the basic arrangement of the image display apparatus.

The image display apparatus shown generally by P comprises an image display device 2 for displaying an image and a viewing optical system 1 for projecting that image onto a viewer s eyeball. It is preferable that the viewing optical system 1 is a prism that is shown again by reference 1 and forms a part of eyeglasses, wherein the prism 1 is made up of at least two surfaces, and includes at least two rotationally asymmetric surfaces, and light leaving the image display device 2 is reflected odd-numbered times within the prism 1 before it is guided to the viewer s eyeball.

Thus, because the viewing optical system is made up of the prism 1 that forms a part of eyeglasses, the wearer of the instant image display apparatus 2 would look objectively quite natural, so both the viewer and those around one would pass the time comfortably.

The viewing optical system or prism 1 is made up of at least two surfaces in such a way that the optical surfaces are located one on the viewer s eyeball side and one on a side spaced away from the viewer s eyeball side so that light leaving the image display device 2 can pass through them before it is finally guided to the viewer s eyeball. In the viewing optical system or prism 1 that is located in front of the viewer s eyeball and made up of at least two surfaces, internal reflection takes place at the two surfaces: one on the viewer s eyeball side and one on the side spaced away from the viewer s side; in other words, the viewing optical system or prism 1 works as a bar type optical device. In addition, the inside and outside shapes of the prism 1 are configured in such a way as to provide a part of the frame of eyeglasses G.

It is thus possible to provide an eyeglasses type image display apparatus that is much more reduced in terms of size, weight and cost, and much more improved in terms of design. More specifically, it is possible to provide an eyeglasses type image display that is so reduced in terms of size and weight that it can be set up as a part of eyeglasses, and has the see-through capability of simultaneously view both electronic images and the outside without intercepting a wide see-around (ambient field of view) or an outside field of view.

Moreover, as the prism 1 further includes at least two rotationally asymmetric surfaces, it works more in favor of correction of aberrations occurring from decentration. The optical system or prism 1 made up of at least two surfaces and designed to reflect light multiple times is constructed from decentered surfaces that are tilted and shifted with respect to the optical axis. With such an arrangement, the image at the image display device 2 can be projected by multiple reflections onto the viewer s eyeball. However, at the decentered surfaces there is decentration aberration produced in addition to usual Seidel aberrations. That aberration cannot be corrected at an ordinary rotationally symmetric surface. By configuring at least two of the optical surfaces forming the prism 1 as rotationally asymmetric surfaces, the decentration aberration can be corrected. With only one rotationally asymmetric surface, it would be difficult to achieve satisfactory correction of decentration aberration occurring from two transmissions and five reflections. By using at least two rotationally asymmetric surfaces, it is possible to achieve satisfactory aberration correction.

Light leaving the image display device 2 is reflected odd-numbered times within the prism 1, and guided to the viewer s eyeball: image-bearing light leaving the image display device 2 and entering the prism 1 leaves the prism 1 in the same orientation, forming an exit pupil and arriving at the viewer s eyeball. Thus, if the image display device 2 is located near eyeglasses G so that light from it is guided through the viewing optical system or prism 1 forming a part of the frame G3 of eyeglasses G to the viewer s eyeball, it is then possible for the viewer to view an image enlarged at the display device as a virtual image.

By using the prism 1 made up of at least two surfaces to set up the viewing optical system 1, it is possible to configure the optical device in front of the viewer s eyeball in a small, low-profile bar form. This in turn makes it possible to reduce an area that blocks the outside field of view of the viewer, thereby achieving high see-around (large ambient field of view) capability. In addition, if the thickness of the prism is set at not greater than 4 mm, it is possible to achieve about 100% outside image field of view even with the apparatus mounted on the head.

Accordingly, there can be a wearable image display apparatus achieved, which helps ease the wearer of a sense of discomfort and troublesomeness so that the wearer objectively could look quite natural. In addition, this apparatus can have ever higher see-through and see-around capabilities.

It is preferable that of at least two rotationally asymmetric surfaces, the first is located at a position in proximity to the viewer upon viewing, and the second is located outside the viewer upon viewing.

Thus, if, of the two rotationally asymmetric surfaces, the first is located at a position in proximity to the viewer upon viewing and the second is located outside the viewer upon viewing, the viewing optical system or prism 1 is then interposed between the two rotationally asymmetric surfaces, so it is possible to use the asymmetric feature of both surfaces to achieve satisfactory correction of aberration occurring from the decentered optical surfaces forming the prism 1.

Consequently, the performance of the viewing optical system 1 can be improved enough to provide clearer, more resolved images to the viewer.

It is preferable that the second surface located outside the viewer upon viewing has positive power in the Y-Z plane.

Thus, by allowing the second surface located outside the viewer upon viewing to have positive power in the Y-Z plane, it can be configured in conformity to the frame G3 of eyeglasses G. It is here noted that when the inside surface of the prism 1 is configured in conformity to the lens G2 of eyeglasses G, it is apt to have a concave shape. However, as the outside surface of the prism 1 is allowed to have positive power, it causes the prism 1 to have positive power throughout.

As a consequence, the viewing optical system or prism 1 can be configured in conformity to the frame G3 of eyeglasses G, and the prism 1 can have positive power throughout.

The exit surface of the viewing optical system 1 for the viewer s eyeball is preferably configured in conformity to the bottom shape of the lens G2 of eyeglasses G.

Thus, by configuring the exit surface of the prism or viewing optical system 1 for the viewer s eyeball in conformity to the bottom shape of the lens G2 of eyeglasses G, the prism 1 can be located as a part of the frame G3 of eyeglasses G.

Consequently, the viewing optical system 1 is built in a part of eyeglasses G so that the wearer of the image display apparatus P could objectively look quite natural, allowing both the viewer and those around one to pass the time comfortably.

It is preferable that light leaving the image display device 2 is reflected five times within the viewing optical system or prism 1 before it leaves the prism 1 and arrives at the viewer s eyeball.

Thus, by reflecting the light from the image display device 2 five times within the prism 1 before it leaves the prism and arrives at the viewer s eyeball, the display plane of the image display device 2 and the viewer s eyeball can be aligned in the same orientation because of odd-numbered reflections. Accordingly, the image display device 2 can be located near the position of the temple segment G1 of eyeglasses. Five internal reflections within the prism 1 make it possible to increase the length of the optical path through the viewing optical system even when it is of a low-profile, small format.

Accordingly, the prism 1 can make sure the necessary optical path length even when it is of a low-profile, small format.

The viewing optical system is preferably a prism made up of at least two optical surfaces.

As the viewing optical system 1 is constructed in a prism form made up of at least two optical surfaces, it works in favor of making the image display apparatus P compact. When there are five reflections within the prism 1, light from the image display device 2 enters the prism from its entrance surface, and is reflected at a surface opposite to the entrance surface and then reflected at a surface on the entrance surface side, after which it is reflected three times. Thereafter, the light leaves a transmitting surface on the entrance surface side for projection onto the viewer s eyeball. The prism 1 including such an optical path has on its inside surface with respect to the viewer functions of incidence, exit and two reflections and on its outside surface a function of three internal reflections, five reflections in all, thereby projecting an image on the display device onto the viewer s eyeball.

Consequently, the prism 1 may be made up of fewer surfaces, resulting in facility of processing and cost reductions.

The viewing optical system is preferably a prism made up of at least three optical surfaces.

As the viewing optical system or prism 1 is made up of at least three optical surfaces, it works in favor of making the image display apparatus P compact and allowing for high resolution.

When a prism consisting only of two surfaces is used for five internal reflections, the entrance surface and the exit surface often become the same surface because incidence and exit take place in the same direction. In that case, the angles of incidence and exit must be controlled by varying the inclination of that surface, often resulting in difficulty with which the shape for aberration correction is kept intact. To implement aberration correction while the positions of the display apparatus and the viewer s eyeball are kept intact, it is preferable to separate the entrance surface from the exit surface. Thus, by configuring the entrance surface as a transmitting surface, allowing for three internal reflections at the surface opposite to the entrance surface and letting the exit surface have a function of transmission simultaneously with a function of two internal reflections, it is possible to implement five reflections in all to project an image on the display device onto the viewer s eyeball.

It is also preferable that the viewing optical system 1 is the prism 1 made up of at least four optical surfaces.

Thus, as the viewing optical system 1 is made up of at least four optical surfaces, it enables the entrance surface to be separated from the exit surface, and the reflecting surface opposite to the entrance surface to be divided into two. Consequently, there is a specific merit ensuing from the separation of the entrance surface from the exit surface in the case of the aforesaid three-lenses arrangement and, at the same time, the reflecting surface (the $4^{th}$ surface) opposite to the exit surface allows for one reflection and the inclination of that surface can be freely set, ending up with facility of control of the angle of exit. Consequently, by configuring the entrance surface as a transmitting surface, allowing for two internal reflections at the surface opposite to the entrance surface, letting the exit surface have a function of transmission simultaneously with a function of two internal reflections and allowing for one internal reflection at the surface opposite to the exit surface, it is possible to project an image on the display device onto the viewer s eyeball through five reflections in all.

For the viewing optical system or prism 1, it is preferable that there is a primary image formed inside, which is in turn projected onto the viewer s eyeball.

The viewing optical system or prism 1 is required to have two functions: one of forming the primary image and another of projecting that primary image onto the viewer s eyeball. For this reason, the degree of flexibility of the optical system grows high enough to be compatible with a variety of design specifications. For instance, if the size of the primary image is controlled, it is then possible to make the diameter of the exit pupil larger than could be achieved with direct imaging.

For the viewing optical system 1, it is preferable that the exit pupil S is formed near the $3^{rd}$ surface of the prism 1 or between the $3^{rd}$ surface and the viewer s eyeball.

As the exit pupil S of the viewing optical system 1 is formed near the $3^{rd}$ surface of the prism 1 or between the $3^{rd}$ surface and the viewer s eyeball, it leads to a reduced or limited shading of light beams at the rim of the image being viewed.

Consequently, it is possible for the viewer to view clear images as far as the rim of the screen.

The viewing optical system 1 is preferably located in such a way as to form a part of the frame G3 of eyeglasses G.

In use, the image display apparatus P is usually mounted on the head or the face. With a conventional image display apparatus P mounted on the head, however, there would be objectively weird impressions given to those around one. In contrast, the viewing optical system according to the embodiment of the invention here is located in such a way as to form a part of the frame G3 of eyeglasses G, so there would be only impressions left that the wearer would look just like those who put on ordinary eyeglasses, or the eyeglasses G would appear somewhat large.

As a consequently, the wearer would be less likely to give visually weird impressions to those around one.

It is preferable that the image display device 2 is located at an end face of the temple segment G3 of eyeglasses G and in opposition to the entrance for capturing images from the viewing optical system 1.

As the image display device 2 is located at an end face of the temple segment G3 of eyeglasses G and in opposition to the entrance surface for capturing images from the viewing optical system 1, it enables the image display device 2 to be located in the eyeglasses G and in opposition to the entrance surface of the viewing optical system or prism 1, so that images can be viewed in a state where the prism 1 remains integral with the eyeglasses G.

Consequently, even with the image display apparatus P mounted in place, the wearer would look quite natural.

FIG. 1 is illustrative in perspective of the eyeglasses type image display apparatus P according to the embodiment here, and FIG. 2 is a front view of the eyeglasses type image display apparatus P.

The eyeglasses G of the image display apparatus P include temple segments G1 positioned on the viewer s ears, lenses G2, and a frame G3 for supporting the lenses G2 and foldably joined to the temple segments G1. The frame G3 includes an actuator segment G4 having a prism 1 received in it. Referring to the actuator segment G4 has the prism 1 received in it, when the image display apparatus P is not in use, it acts as the ordinary frame G3 of the eyeglasses as shown in FIG. 2(a), and when the image display apparatus P is in operation, it is actuated to move the prism 1 in front of and over the lens G2 for displaying an image as shown in FIG. 2(*b*). In the embodiment here, the actuator segment G4 is supported on the frame G3 by a shaft member (not shown), and rotatable with respect to that shaft.

FIG. 3 is illustrative of the basic arrangement of the image display apparatus P incorporating the prism 1.

The object of the embodiment here is to use the prism 1 and the image display device 2, thereby providing the image display apparatus P that can be reduced in terms of size, weight and cost, and allows the wearer to look quite natural.

The image display apparatus P according to the instant embodiment uses a liquid crystal display device as the image display device 2. The liquid crystal display device requires a backlight BL as a light source. In the embodiment here, there is a lighting lens L interposed between the backlight BL and the image display device 2.

With such an arrangement of the image display apparatus P according to the embodiment here, image-bearing light leaving the image display device 2 is bent by the prism 1 having positive power in an eyeball direction, and it is possible for the viewer to view an image as a virtual image.

The vicinity of an exit segment provides an exit pupil S as an aperture stop so that an image may be viewed even when the prism itself is slimmed down and narrowed down.

Moreover, when the image display device 2 is in a liquid crystal display device form, the backlight BL is required. In view of lighting efficiency, it is desired to position an image on the light source near an exit window.

It is preferable that a reflecting portion is located somewhat outside the front direction of the eyeball. This leaves the front of the field of view unlikely to be blocked by the display screen or the reflecting portion. It is also possible to curtail the optical path and, hence, make the prism optical system more compact.

Figure 4:
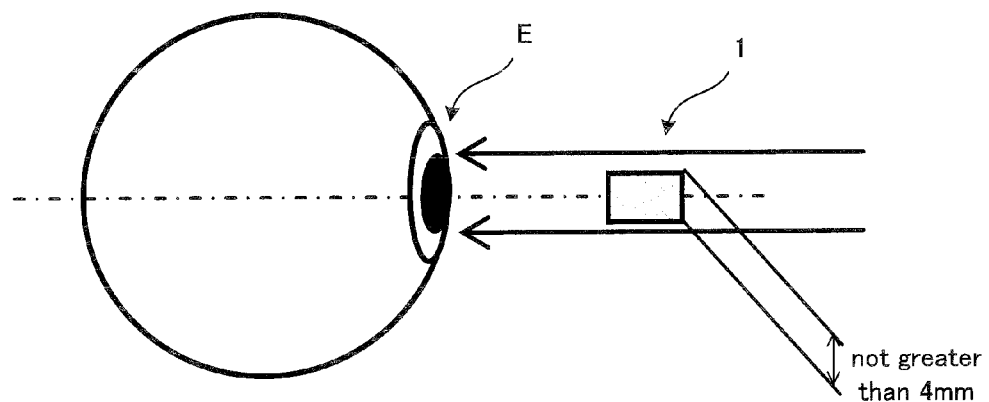
FIG. 4 is a side view of the image display apparatus.
Figure 5:
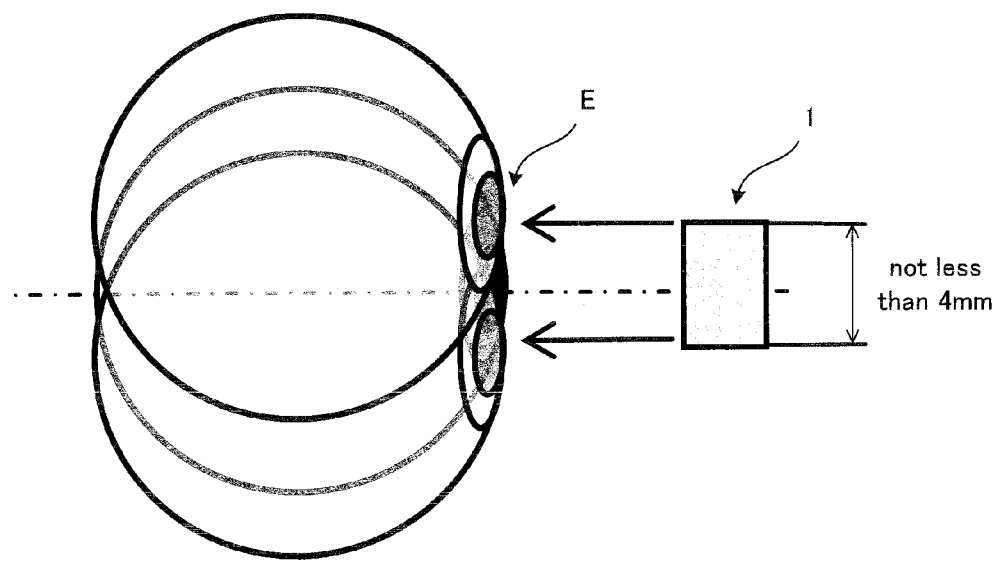
FIG. 5 is a side view of the image display apparatus.

FIG. 4 is a side view of the prism-incorporating image display apparatus, and FIG. 5 is a side view of the prism-incorporating image display apparatus.

As the portion of a prism 1 in opposition to the viewer s pupil E has a vertical width set at not greater than 4 mm that is a human being s average pupil diameter as shown in FIG. 4, it causes scenes behind the prism 1 to be visible to the viewer s pupil E from above and below the prism 1: there is the see-through effect obtained.

As the portion of a prism 1 in opposition to the viewer s pupil E has a vertical width set at not less than 4 mm that is a human being s average pupil diameter as shown in FIG. 5, the increased vertical width makes a tolerance to vertical shifting wide.

Figure 6:
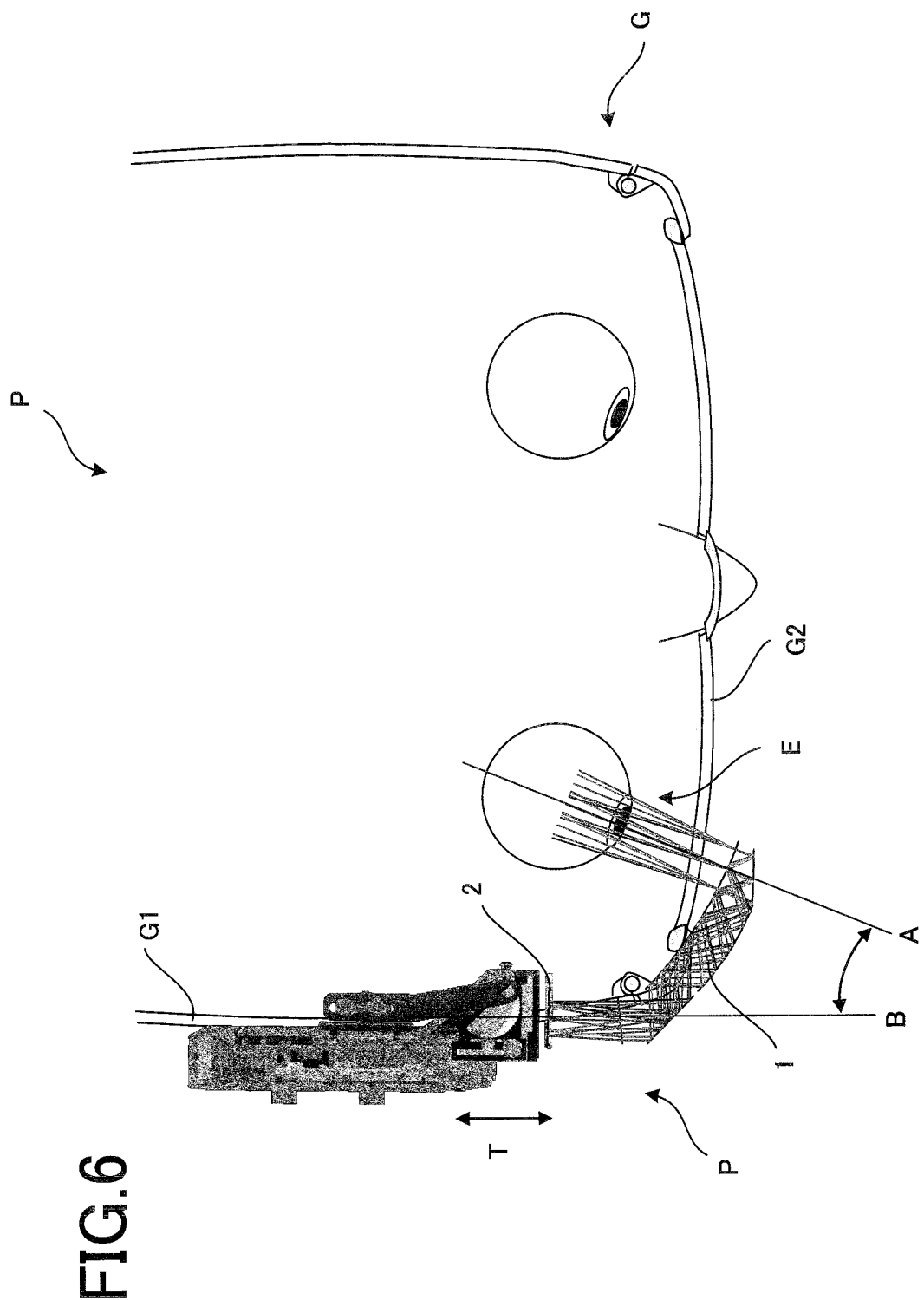
FIG. 6 is illustrative of the whole of the eyeglasses type image display apparatus.

FIG. 6 is illustrative of the eyeglasses type image display apparatus P incorporating the prism optical system 1.

According to the image display apparatus P according to the embodiment here, it is possible to take hold of the see-through function that enables the outside world and electronic images to be simultaneously viewed without intercepting the outside field of view, and to reduce the image display apparatus P in terms of size, weight and cost.

As shown in FIG. 6, the prism 1 may be mounted on eyeglasses G. Image-bearing light leaving the image display device oriented in the front direction travels toward the pupil E through the prism 1. The prism 1 has positive power enough to enlarge an image on the image display device and allow the wearer to view it as a virtual image. If the image display device 2 is moved back and forth in a direction substantially along the temple segment G1 (indicated by an arrow T), it is then possible to adjust the image display device 2 in alignment with the viewer s diopter. It is preferable that the angle made by an axial chief ray B leaving the center of the image display device 2 and an axial chief ray B leaving the prism 1 and arriving at the center of the viewer s pupil is 0° to 40°.

The image display device 2 is located at an end face of the temple segment G1 of eyeglasses G and in opposition to the entrance surface for capturing an image from the prism 1.

The image display apparatus P according to the embodiment here is now explained with reference to several examples.

The specific constituting parameters of the prism 1 will be given later. As shown typically in FIGS. 7, 12, 17 and 22, they are determined on the basis of the results of back ray tracing in which the position at which the viewer implements viewing is defined as an object plane for the viewing optical system 1 at the time of back ray tracing, and light rays passing through the object plane travel toward the image display device 2 via the viewing optical system or prism 1.

Referring here to the coordinate system involved, as shown typically in FIGS. 7, 12, 17 and 22, the origin O of the decentered optical surface of a decentered optical system is defined by a point of intersection O of the object plane with an axial chief ray A from the object plane toward the prism 1. The Z-axis positive direction is defined by a direction of the center chief ray A from the origin O toward the prism 1 side, and the Y-axis positive direction is defined by a direction orthogonal to the Z-axis on the image display device 2 side, and the Y-Z plane is defined by a sheet plane of FIG. 1, and FIG. 10. And the X-axis positive direction is defined by an axis that forms a right-handed orthogonal coordinate system with the Y- and Z-axes.

Given to each decentered surface are the amount of decentration of the coordinate system—on which that surface is defined—from the center of the origin of the optical system (X, Y and Z in the X-, Y- and Z-axis directions) and the angles ($\alpha$, $\beta$, $\gamma$ (°)) of tilt of the coordinate system for defining each surface about the X-, Y- and Z-axes of the coordinate system defined on the origin of the optical system. It is here to be noted that the positive $\alpha$ and $\beta$ mean counterclockwise rotation with respect to the positive directions of the respective axes, and the positive $\gamma$ means clockwise rotation with respect to the positive direction of the Z-axis. Referring to the $\alpha$, $\beta$, $\gamma$ rotation of the center axis of a certain surface, the coordinate system for defining each surface is first $\alpha$ rotated counterclockwise about the X-axis of the coordinate system defined on the origin of the coordinate system defined on the origin of the optical system. Then, it is $\beta$ rotated counterclockwise about the Y-axis of the thus rotated, new coordinate system, and finally $\gamma$ rotated clockwise about the Z-axis of the thus rotated, new another coordinate system.

When a specific surface of the optical function surfaces forming the viewing optical system of each example and the subsequent surface form together a coaxial optical system, there is a surface separation given. Besides, the radii of curvature of the surfaces, and the refractive indices and Abbe constants of the media are given as usual.

It is also noted that coefficient terms to which data are not given in the following constituting parameters are zero. The refractive indices and Abbe constants on a d-line basis (587.56 nm wavelength) are given, and length is given in mm. The decentration of each surface is represented by the quantity of decentration from a reference surface, as mentioned above.

The surface shape of the free-form surface used in the inventive embodiment is defined by the following formula (a). Note here that the axis of the free-form surface is given by the Z-axis of that defining formula.

$$Z = (r^2/R)/\left[1 + \sqrt{\{1-(1+k)(r/R)^2\}}\right] + \sum_{j=1}^{\infty} C_j X^m Y^n \quad (a)$$

In formula (a) here, the first term is the spherical term and the second term is the free-form surface term.

In the spherical term,

R is the radius of curvature of the vertex, k is the conic constant, and $r=\sqrt{(X^2+Y^2)}$.

The free-form surface term is $$\sum_{j=1}^{66} C_j X^m Y^n = C_1 + C_2 X + C_3 Y + C_4 X^2 + C_5 XY + C_6 Y^2 + C_7 X^3 +$$

$$C_8 X^2 Y + C_9 XY^2 + C_{10} Y^3 + C_{11} X^4 + C_{12} X^3 Y + C_{13} X^2 Y^2 +$$

$$C_{14} XY^3 + C_{15} Y^4 + C_{16} X^5 + C_{17} X^4 Y + C_{18} X^3 Y^2 + C_{19} X^2 Y^3 +$$

$$C_{20} XY^4 + C_{21} Y^5 + C_{22} X^6 + C_{23} X^5 Y + C_{24} X^4 Y^2 + C_{25} X^3 Y^3 +$$

$$C_{26} X^2 Y^4 + C_{27} XY^5 + C_{28} Y^6 + C_{29} X^7 + C_{30} X^6 Y + C_{31} X^5 Y^2 +$$

$$C_{32} X^4 Y^3 + C_{33} X^3 Y^4 + C_{34} X^2 Y^5 + C_{35} XY^6 + C_{36} Y^7 \ldots$$

Here $C_j$ (j is an integer of 1 or greater) is a coefficient.

In general, the aforesaid free-form surface has no plane of symmetry at both the X-Z plane and the Y-Z plane. However, by reducing all the odd-numbered terms for X down to zero, that free-form surface can have only one plane of symmetry parallel with the Y-Z plane. For instance, this may be achieved by reducing down to zero the coefficients for the terms $C_2$, $C_5$, $C_7$, $C_9$, $C_{12}$, $C_{14}$, $C_{15}$, $C_{18}$, $C_{20}$, $C_{23}$, $C_{25}$, $C_{27}$, $C_{29}$, $C_{31}$, $C_{33}$, $C_{35}$, ... in the above defining formula (b).

By reducing all the odd-numbered terms for Y down to zero, the free-form surface can have only one plane of symmetry parallel with the X-Z plane. For instance, this may be achieved by reducing down to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... in the above defining formula.

If any one of the directions of the aforesaid plane of symmetry is used as the plane of symmetry and decentration is implemented in a direction corresponding to that, for instance, the direction of decentraton of the optical system with respect to the plane of symmetry parallel with the Y-Z plane is set in the Y-axis direction and the direction of dencentration of the optical system with respect to the plane of symmetry parallel with the X-Z plane is set in the X-axis direction, it is then possible to improve productivity while, at the same time, making effective correction of rotationally asymmetric aberrations occurring from decentration.

The aforesaid defining formula (a) is given for the sake of illustration alone as mentioned above: the feature of the invention is that by use of the rotationally asymmetric plane having only one plane of symmetry, it is possible to correct rotationally asymmetric aberrations occurring from decentration while, at the same time, improving productivity. It goes without saying that the same advantages are achievable even with any other defining formulae.

The examples of the invention are now explained.

Figure 7:
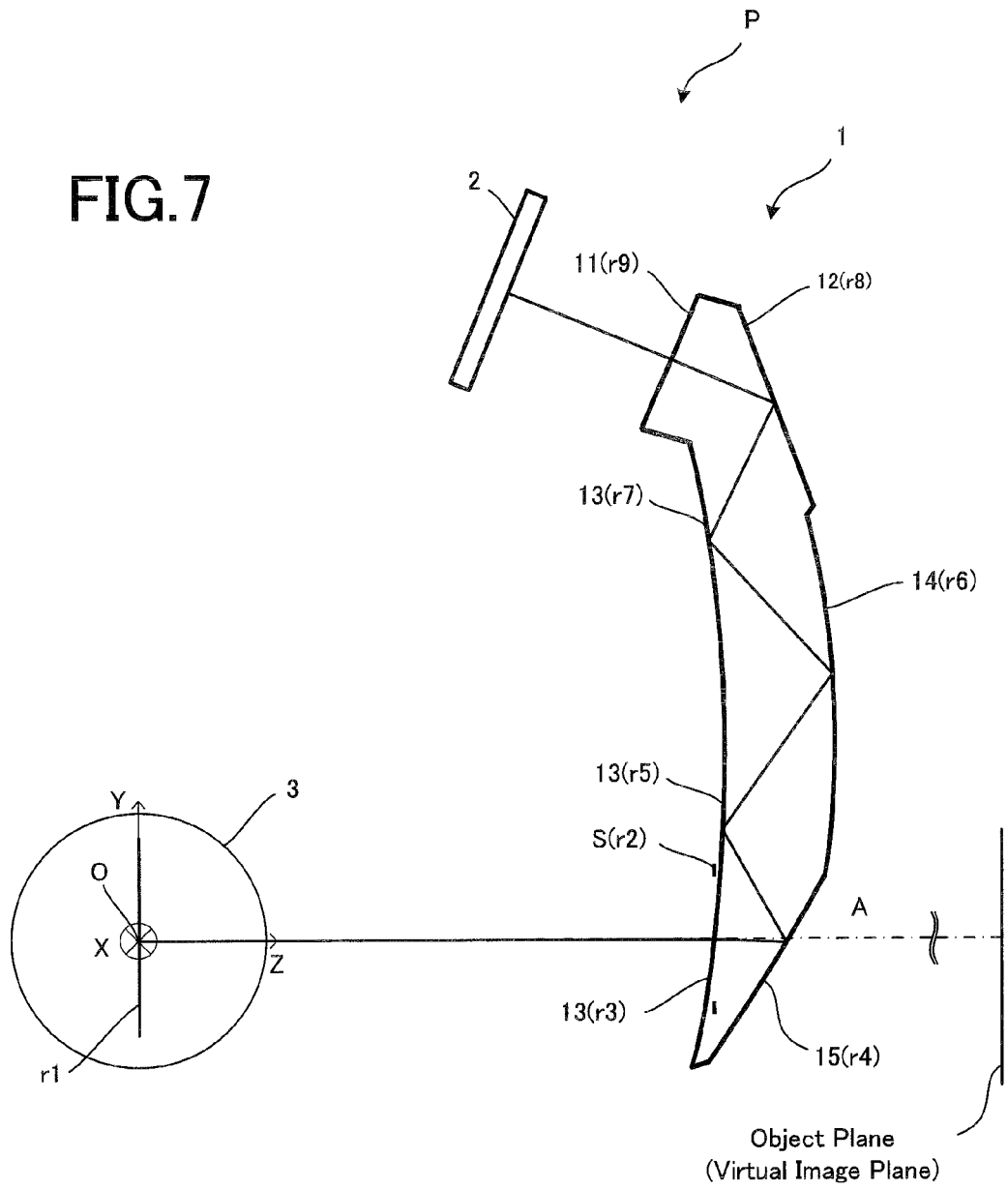
FIG. 7 is illustrative in construction of Example 1 of the viewing optical system.

FIG. 7 is illustrative in conception of the image display apparatus incorporating the prism 1 of Example 1.

As shown in FIG. 7, the image display apparatus P of Example 1 is built up of an image display device 2 for displaying an image and a viewing optical system 1 for projecting an image onto the viewer s eyeball. The viewing optical system 1 is a prism 1 that forms a part of eyeglasses. The prism 1 is made up of five surfaces and includes five rotationally asymmetric surfaces. Light leaving the image display device 2 is reflected odd-numbered times within the prism 1 before it is guided to the viewer s eyeball.

Figure 8:
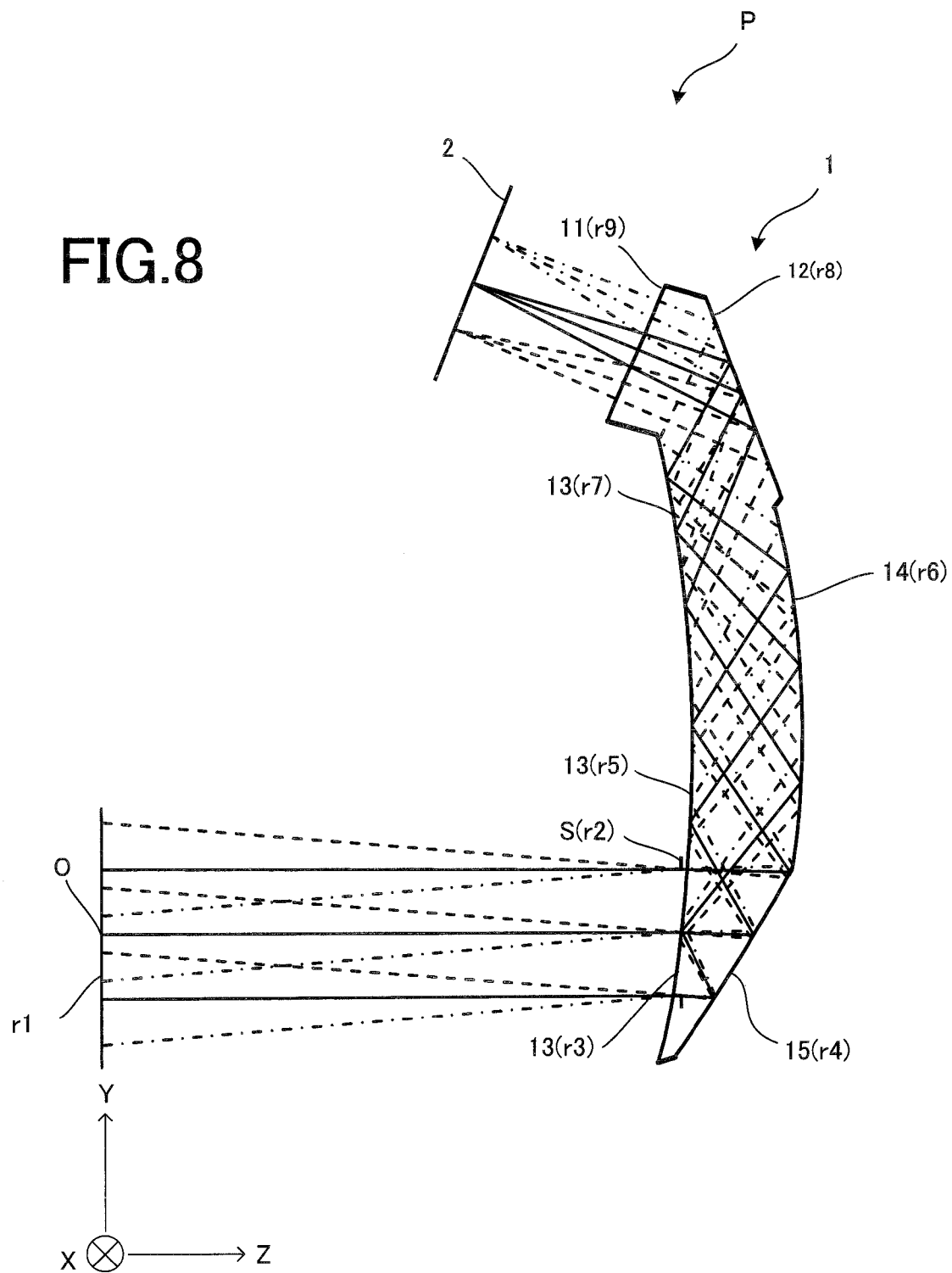
FIG. 8 is an optical path diagram in the Y-Z section for Example 1 of the viewing optical system.
Figure 9:
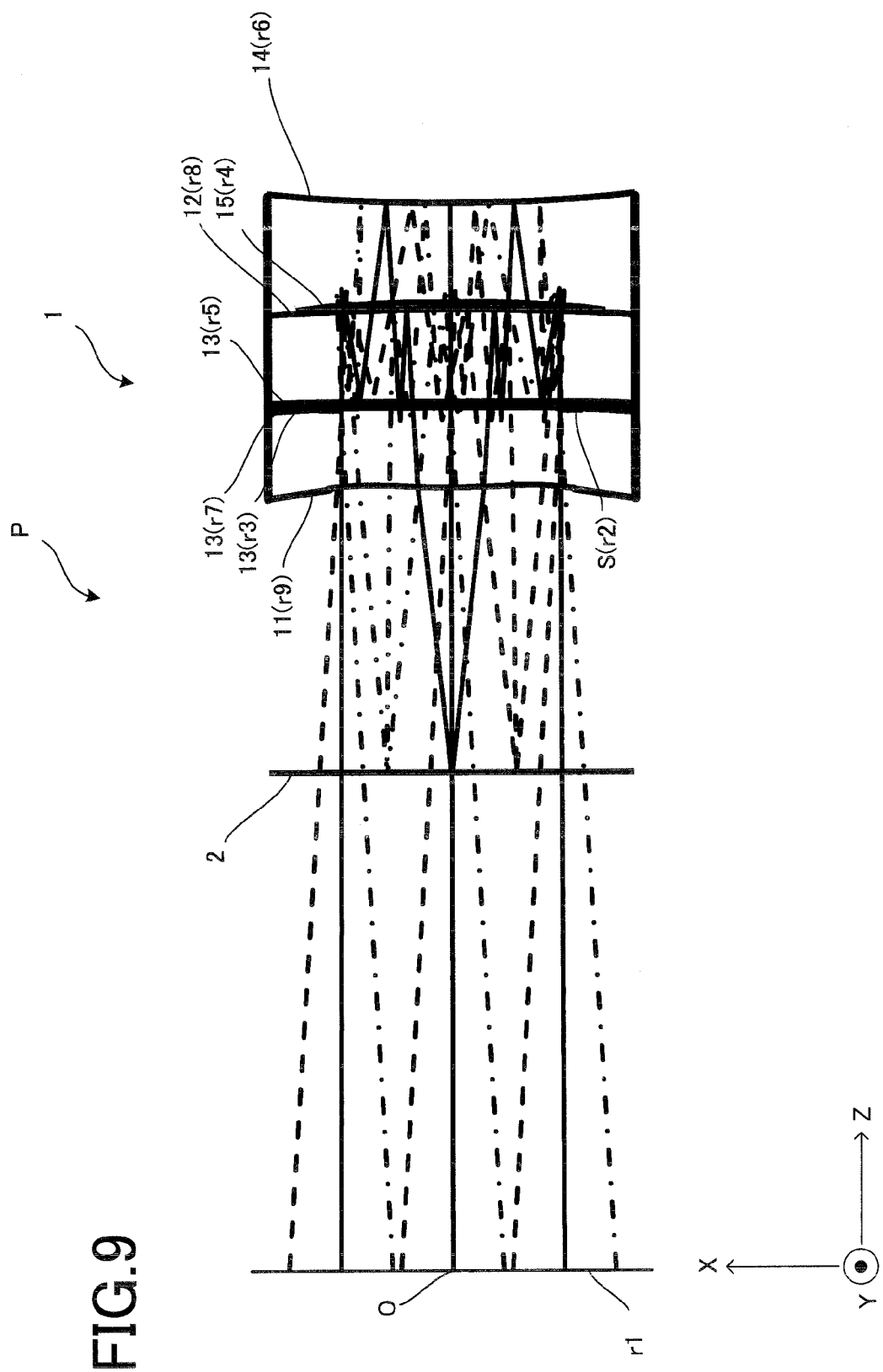
FIG. 9 is an optical path diagram in the X-Z section for Example 1 of the viewing optical system.
Figure 10:
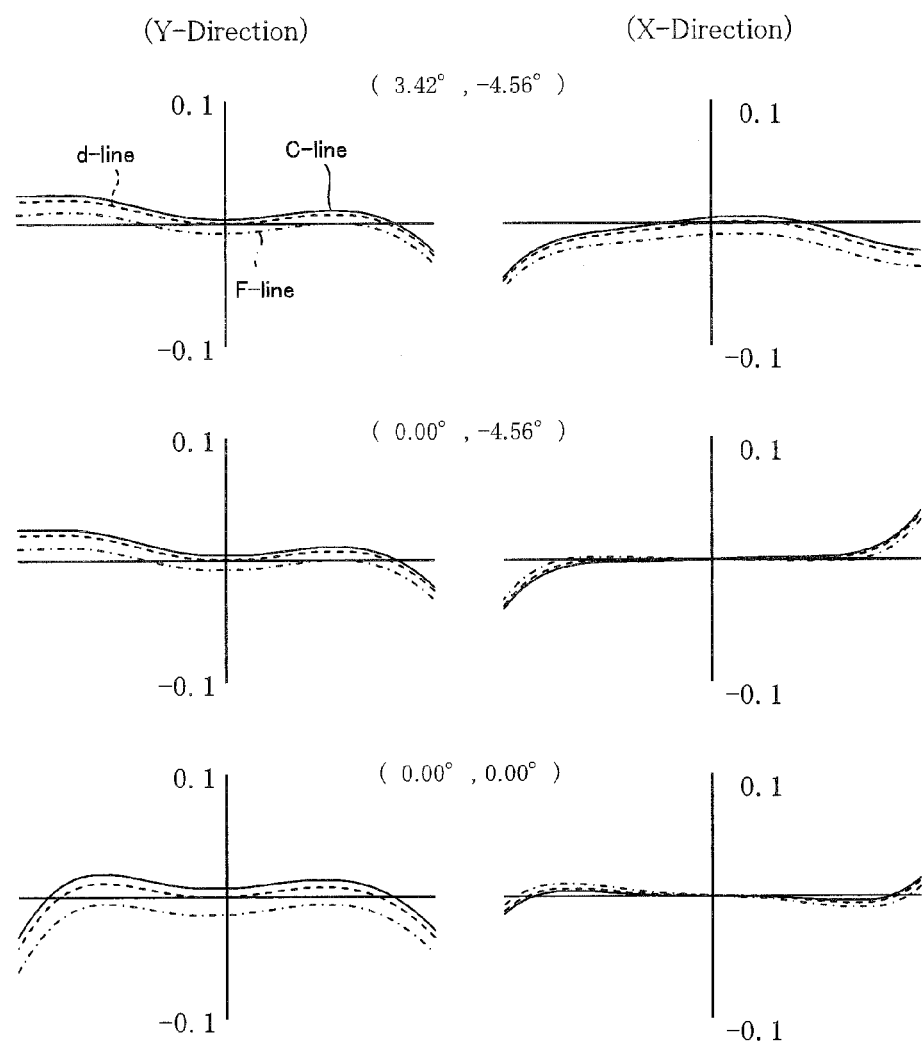
FIG. 10 is a transverse aberration diagram for the whole of the optical system of Example 1.
Figure 11:
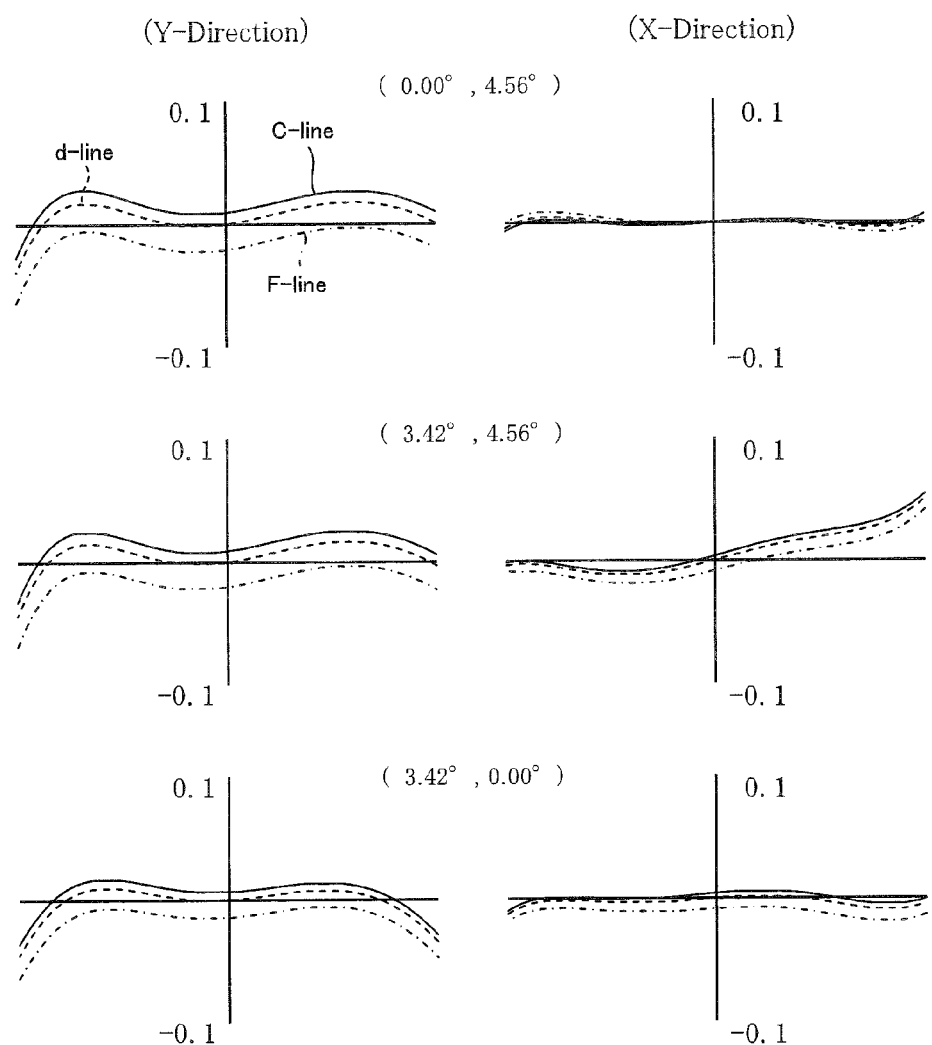
FIG. 11 is a transverse aberration diagram for the whole of the optical system of Example 1.

FIGS. 8 and 9 are illustrative in the Y-Z and X-Z sections of the image display apparatus P equipped with the prism 1 of Example 1, respectively, and FIGS. 10 and 11 are transverse aberration diagrams for the whole optical system.

The image display apparatus P of Example 1 includes the prism 1 as the viewing optical system 1 and the image display device 2.

The prism 1 is formed of five optical surfaces, each having an optical function. The $1^{st}$ surface 11 is located in opposition to the image display device 2, and has a function of transmitting light once. The $2^{nd}$ surface 12 is located in opposition to the image display device 2, but it faces away from the $1^{st}$ surface 11 and has a function of internally reflecting light once. The $3^{rd}$ surface 13 is located in opposition to the image display device 2, but it faces away from the $2^{nd}$ surface 12 as well as the $4^{th}$ and $5^{th}$ surfaces 14 and 15 (as will be referred to later) and has a function of transmitting light once and internally reflecting light twice. The $4^{th}$ surface 14 is located in opposition to the image display device 2 but it faces away from the $3^{rd}$ surface 13 and has a function of internally reflecting light once. The $5^{th}$ surface 15 is located in opposition to the image display device 2, but it faces away from the $3^{rd}$ surface 13 and has a function of internally reflecting light once. There is also an exit pupil S located near the transmitting surface of the $3^{rd}$ surface 13.

There are five free-form surfaces given as the rotationally asymmetric surfaces: $1^{st}$ surface 11, $2^{nd}$ surface 12, $3^{rd}$ surface 13, $4^{th}$ surface 14, and $5^{th}$ surface 15.

Upon back ray tracing, a light beam leaving the exit pupil enters the prism 1 through the $3^{rd}$ surface 13, and is subjected to internal reflection at the $5^{th}$ surface 15, then internal reflection at the $3^{rd}$ surface 13, then internal reflection at the $4^{th}$ surface 14, then internal reflection at the $3^{rd}$ surface 13, then internal reflection at the $2^{nd}$ surface 12, leaving the prism 1 through the $1^{st}$ surface 11. The light beam leaving the prism 1 enters the image display device 2.

Figure 12:
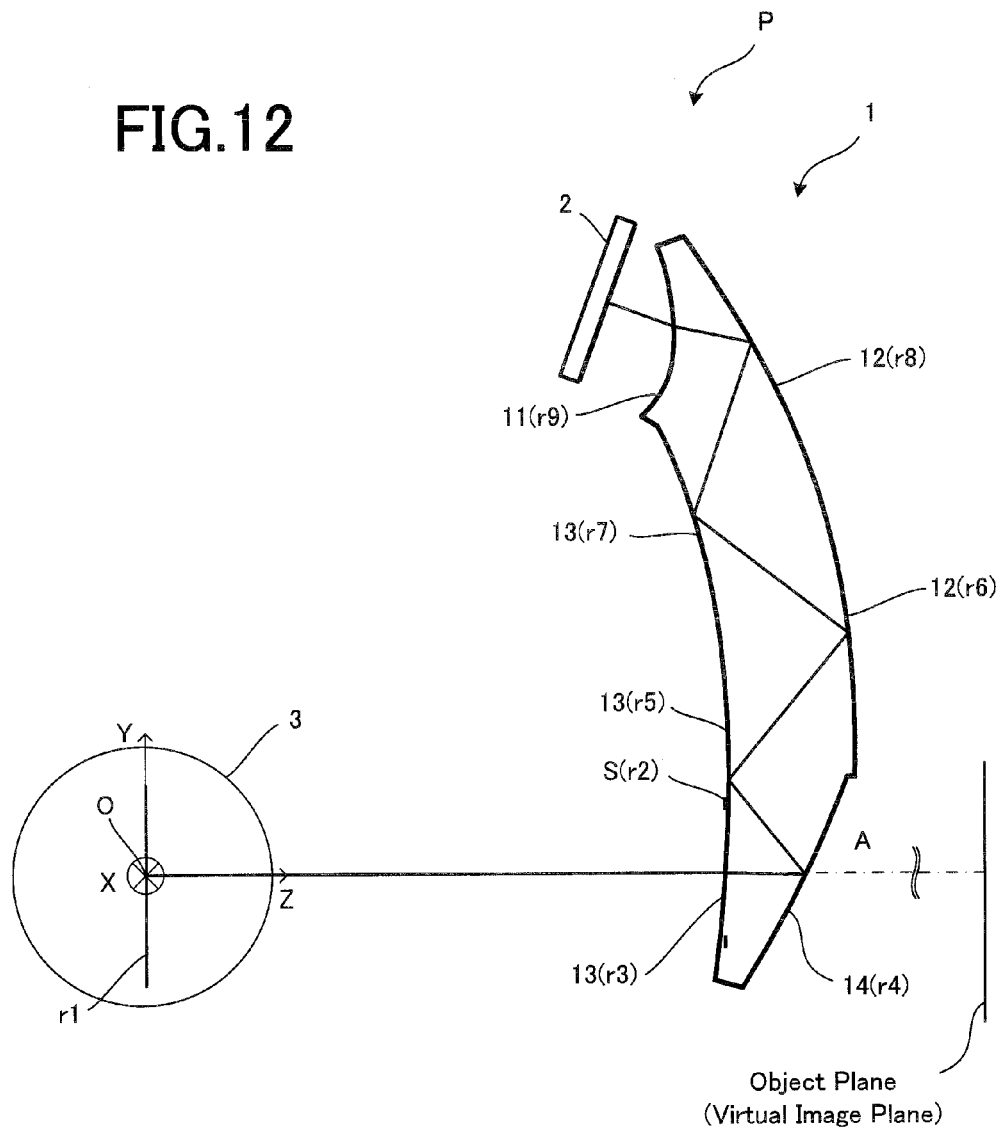
FIG. 12 is illustrative in construction of Example 2 of the viewing optical system.

FIG. 12 is illustrative in conception of the image display apparatus incorporating the prism 1 of Example 2.

As shown in FIG. 12, the image display apparatus P of Example 2 is built up of an image display device 2 for displaying an image and a viewing optical system 1 for projecting an image onto the viewer s eyeball. The viewing optical system 1 is a prism 1 that forms a part of eyeglasses. The prism 1 is made up of four surfaces and includes four rotationally asymmetric surfaces. Light leaving the image display device 2 is reflected odd-numbered times within the prism 1 before it is guided to the viewer s eyeball.

Figure 13:
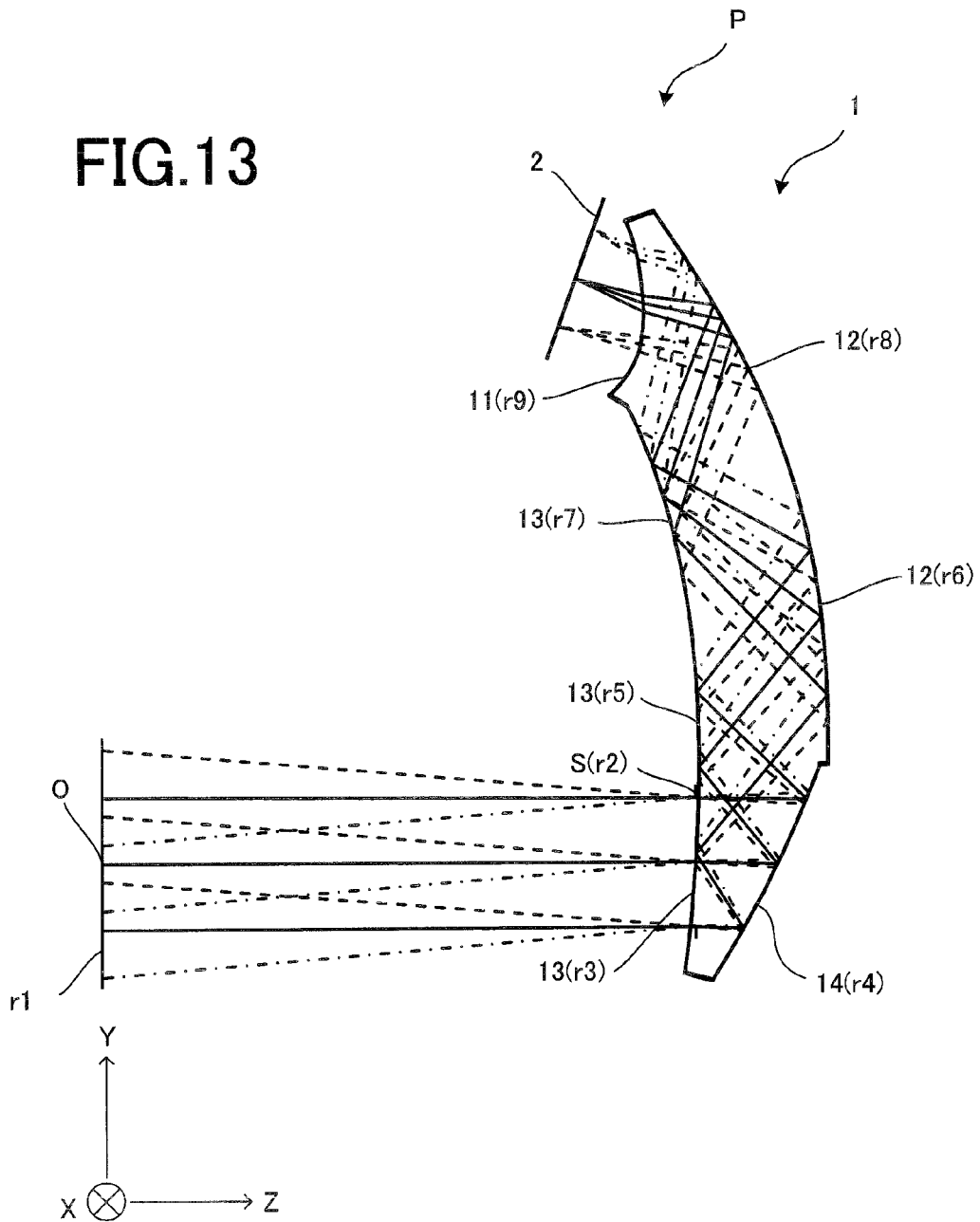
FIG. 13 is an optical path diagram in the Y-Z section of Example 2 of the viewing optical system.
Figure 14:
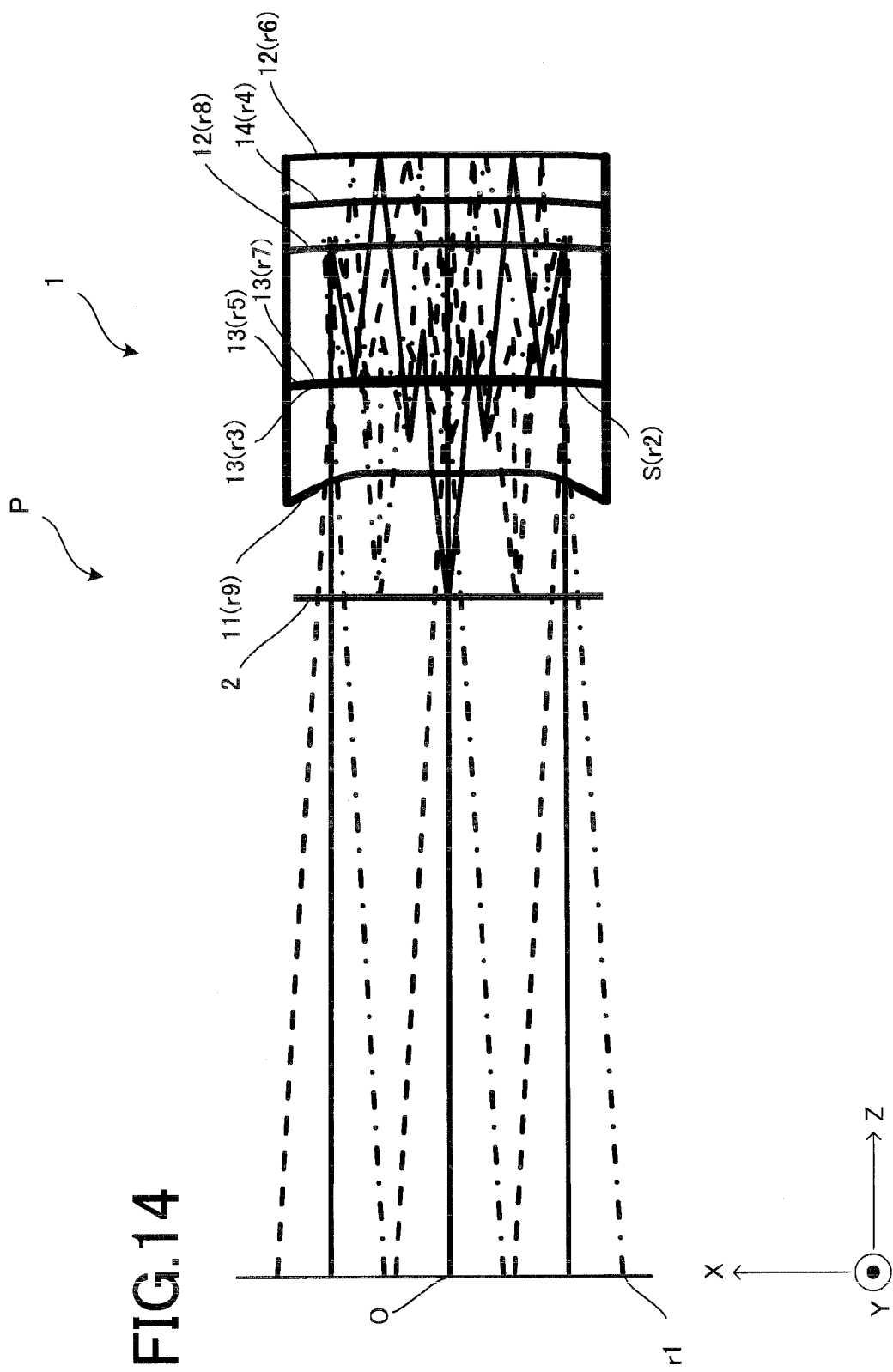
FIG. 14 is an optical path diagram in the X-Z section of Example 2 of the viewing optical system.
Figure 15:
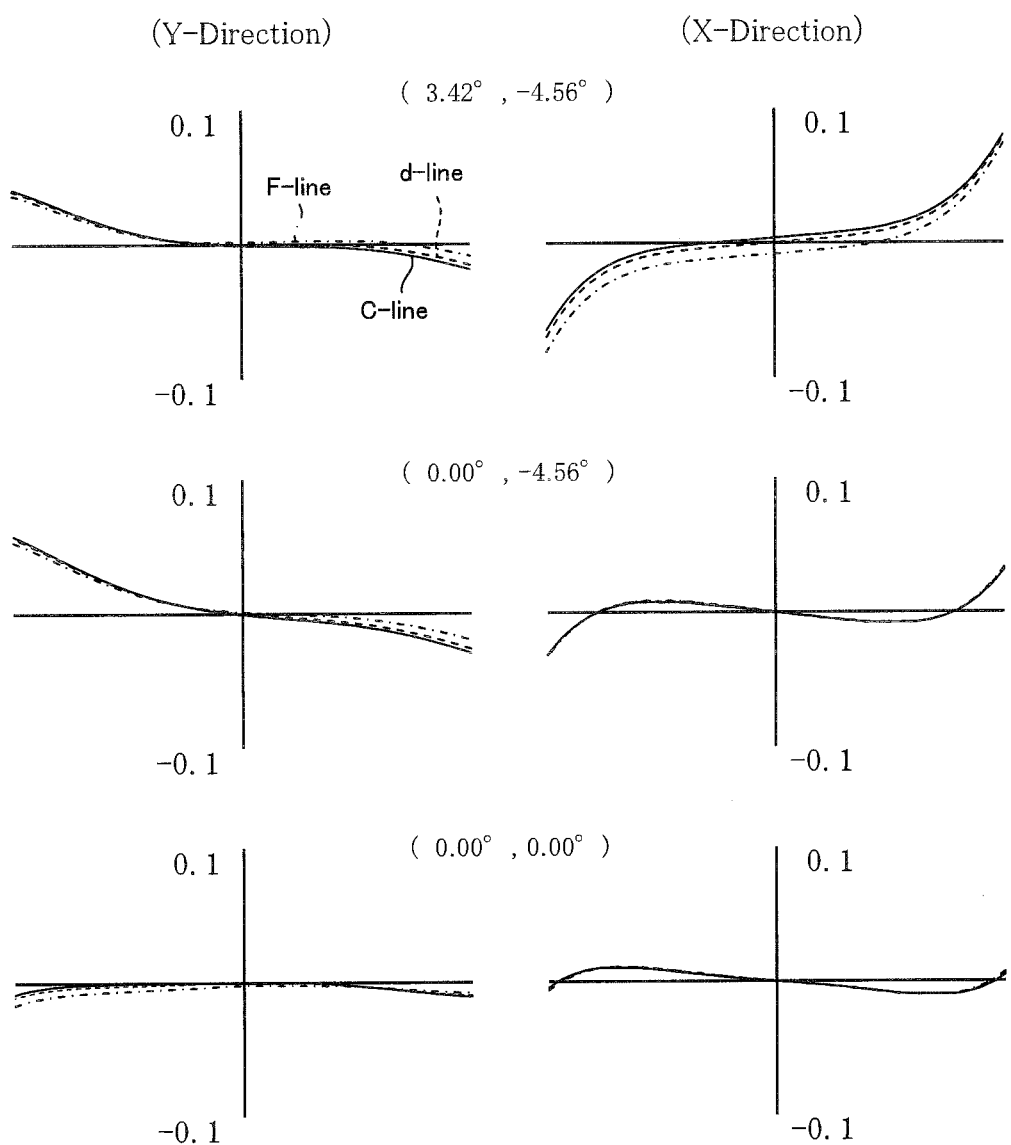
FIG. 15 is a transverse aberration diagram for the whole of the optical system of Example 2.
Figure 16:
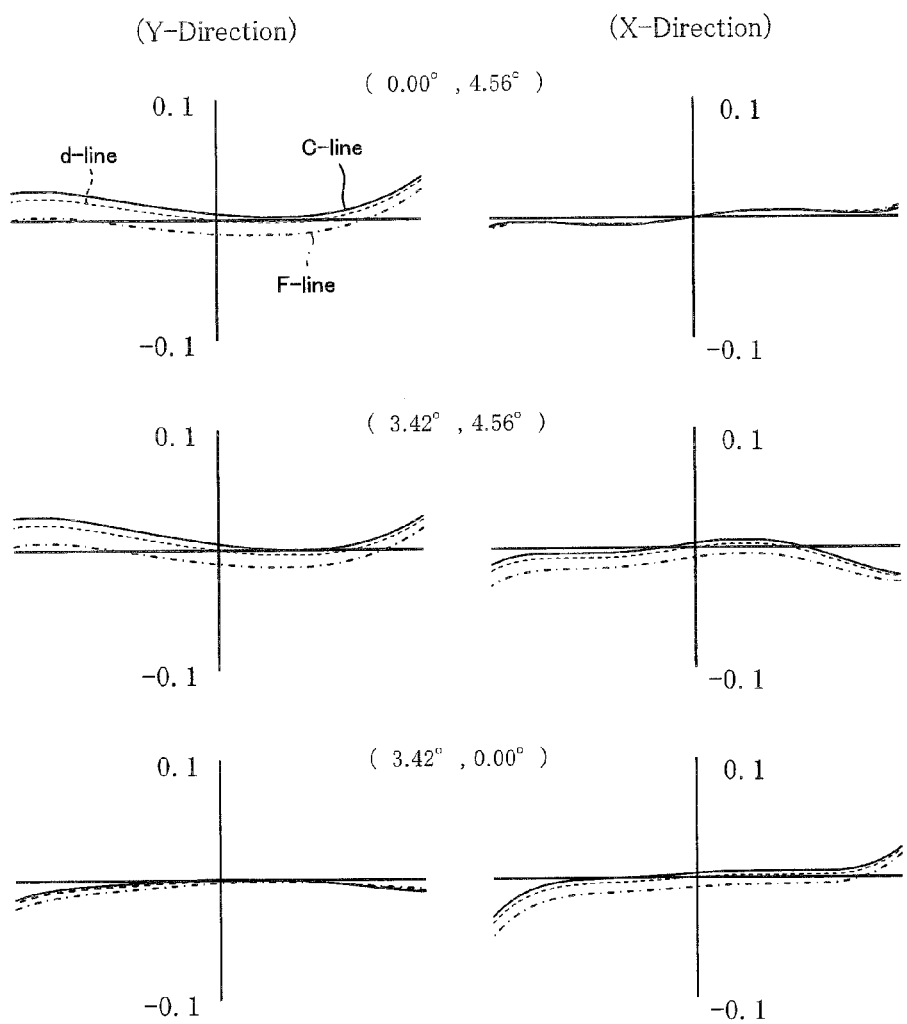
FIG. 16 is a transverse aberration diagram for the whole of the optical system of Example 2.

FIGS. 13 and 14 are illustrative in the Y-Z and X-Z sections of the image display apparatus P equipped with the prism optical system 1 of Example 2, respectively, and FIGS. 15 and 16 are transverse aberration diagrams for the whole optical system.

The image display apparatus P of Example 2 includes the prism optical system 1 and the image display device 2.

The prism 1 is formed of four optical surfaces, each having an optical function. The $1^{st}$ surface 11 is located in opposition to the image display device 2, and has a function of transmitting light once. The $2^{nd}$ surface 12 is located in opposition to the image display device 2, but it faces away from the $1^{st}$ surface 11 and has a function of internally reflecting light twice. The $3^{rd}$ surface 13 is located in opposition to the image display device 2, but it faces away from the $2^{nd}$ surface 12 as well as the 4th surface 14 (as will be referred to later) and has a dual function of transmitting light once and internally reflecting light twice. The 4th surface 14 is located in opposition to the image display device 2 but it faces away from the 3rd surface 13 and has a function of internally reflecting light once. There is also an exit pupil S located near the transmitting surface of the 3rd surface.

There are four free-form surfaces given as the rotationally asymmetric surfaces: 1st surface 11, 2nd surface 12, 3rd surface 13, and 4th surface 14.

Upon back ray tracing, a light beam leaving the exit pupil enters the prism optical system 1 through the 3rd surface 13, and is subjected to internal reflection at the 4th surface 14, then internal reflection at the 3rd surface 13, then internal reflection at the 2nd surface 12, then internal reflection at the 3rd surface 13 and then internal reflection at the 2nd surface 12, leaving the prism 1 through the 1st surface 11. The light beam leaving the prism 1 enters the image display device 2.

Figure 17:
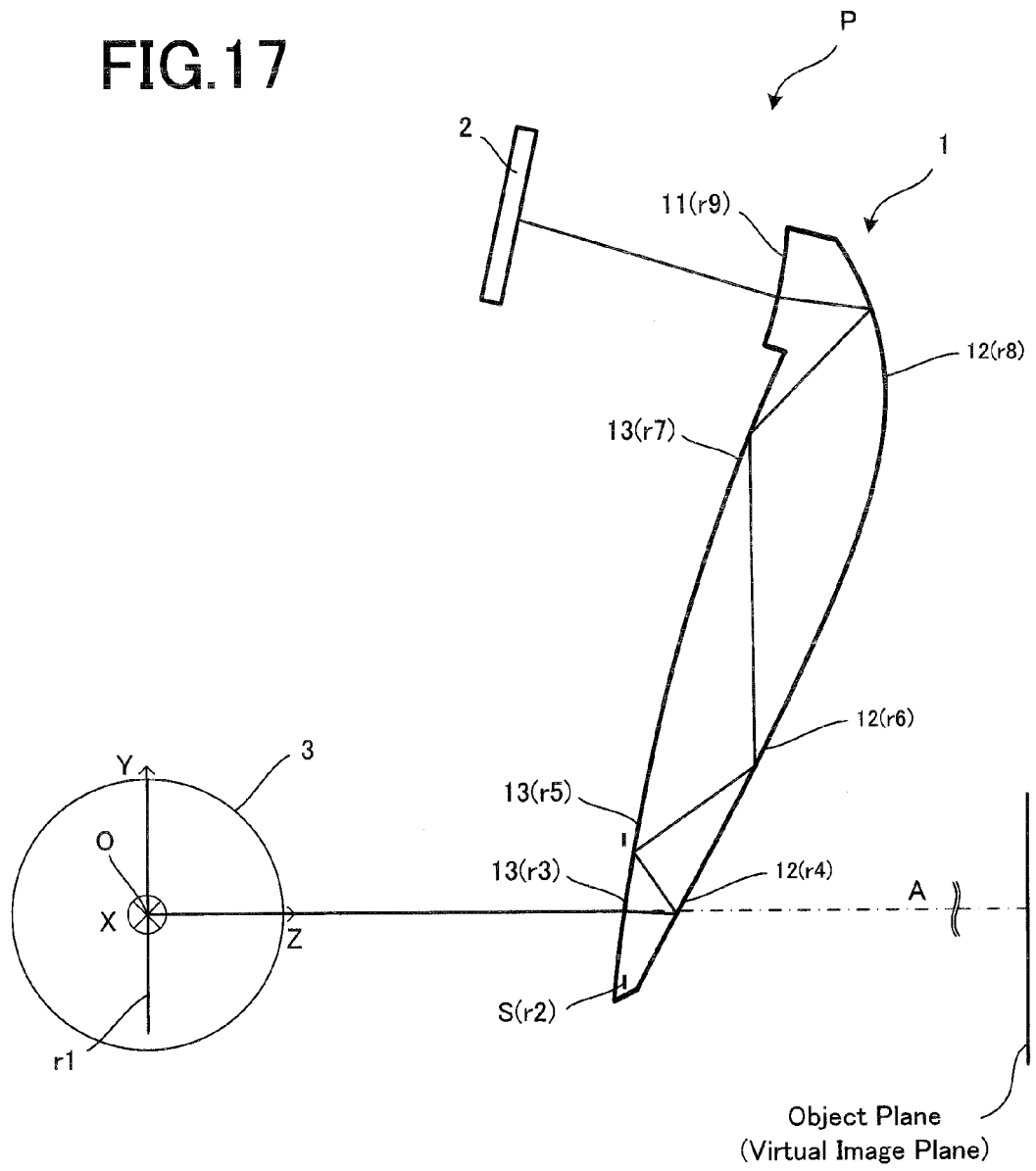
FIG. 17 is illustrative in construction of Example 3 of the viewing optical system.

FIG. 17 is illustrative in conception of the image display apparatus incorporating the prism 1 of Example 3.

As shown in FIG. 17, the image display apparatus P of Example 3 is built up of an image display device 2 for displaying an image and a viewing optical system 1 for projecting an image onto the viewer s eyeball. The viewing optical system 1 is a prism 1 that forms a part of eyeglasses. The prism 1 is made up of three surfaces and includes three rotationally asymmetric surfaces. Light leaving the image display device 2 is reflected odd-numbered times within the prism 1 before it is guided to the viewer s eyeball.

Figure 18:
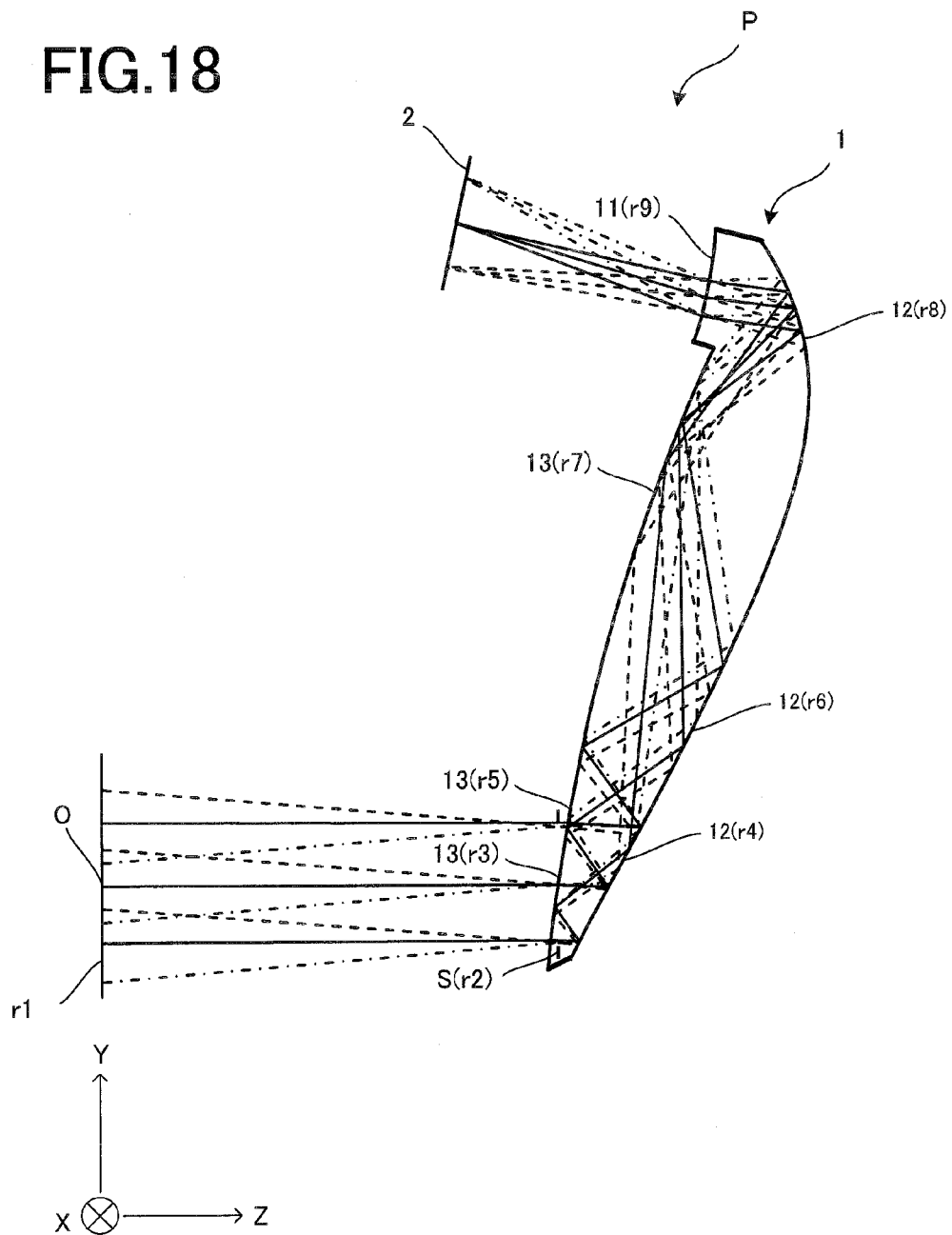
FIG. 18 is an optical path diagram in the Y-Z section of Example 3 of the viewing optical system.
Figure 19:
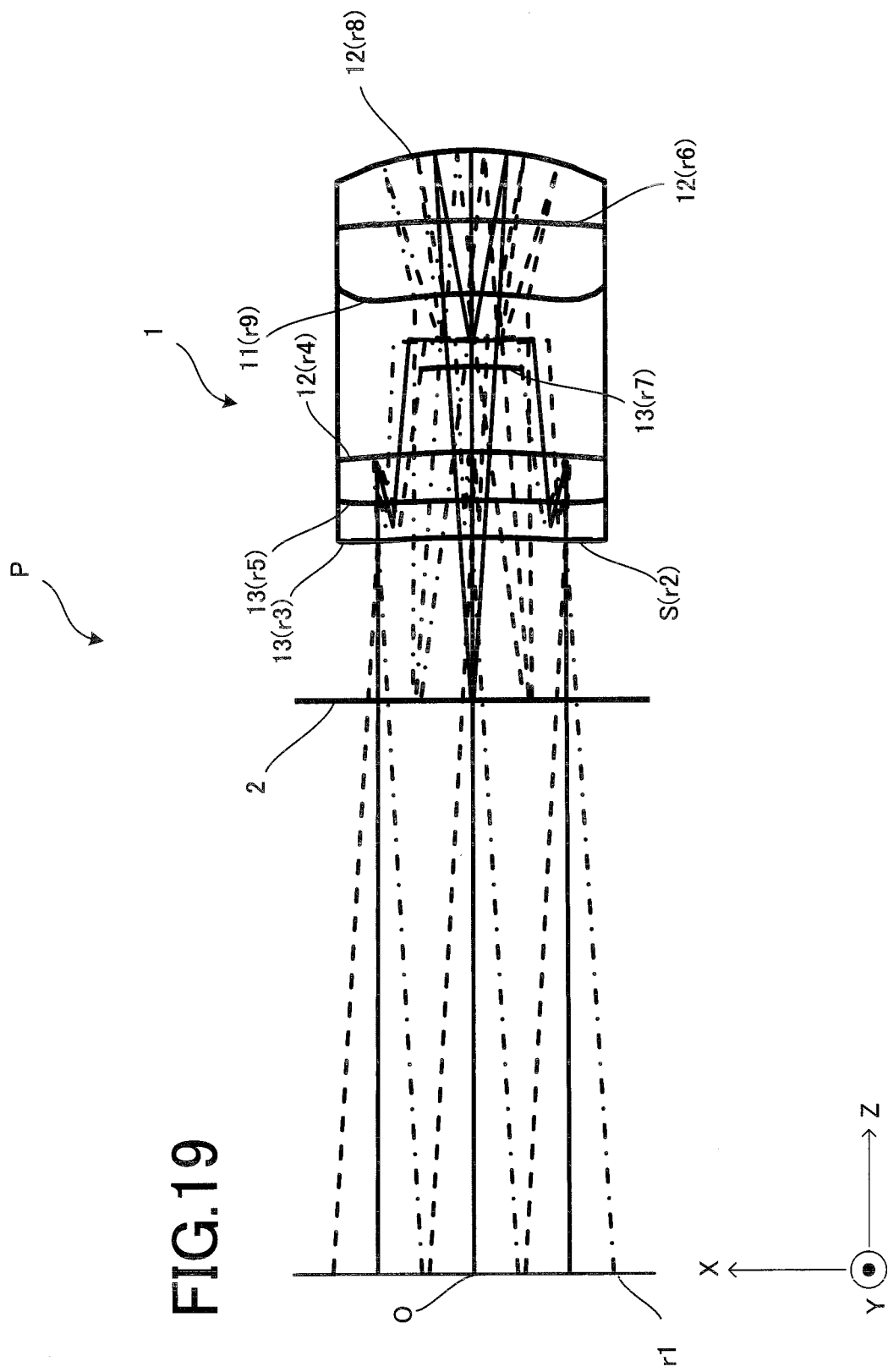
FIG. 19 is an optical path diagram in the X-Z section of Example 3 of the viewing optical system.
Figure 20:
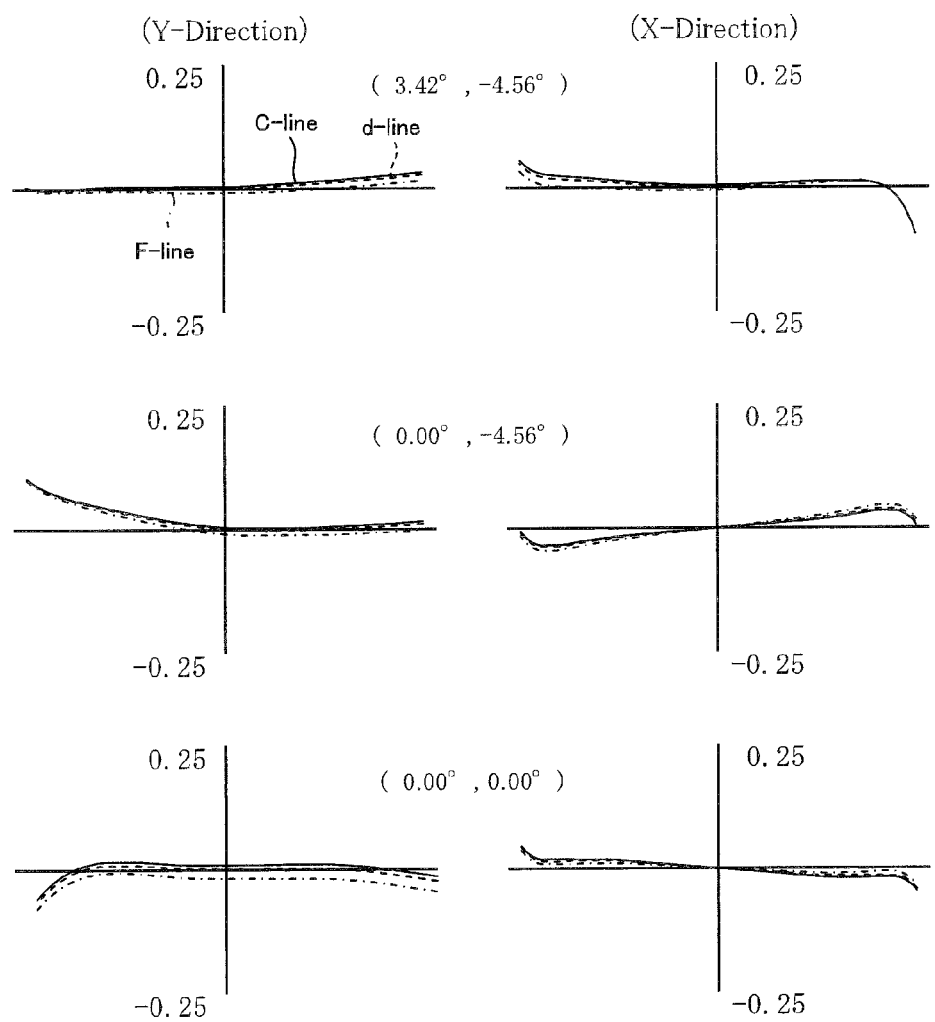
FIG. 20 is a transverse aberration diagram for the whole of the optical system of Example 3.
Figure 21:
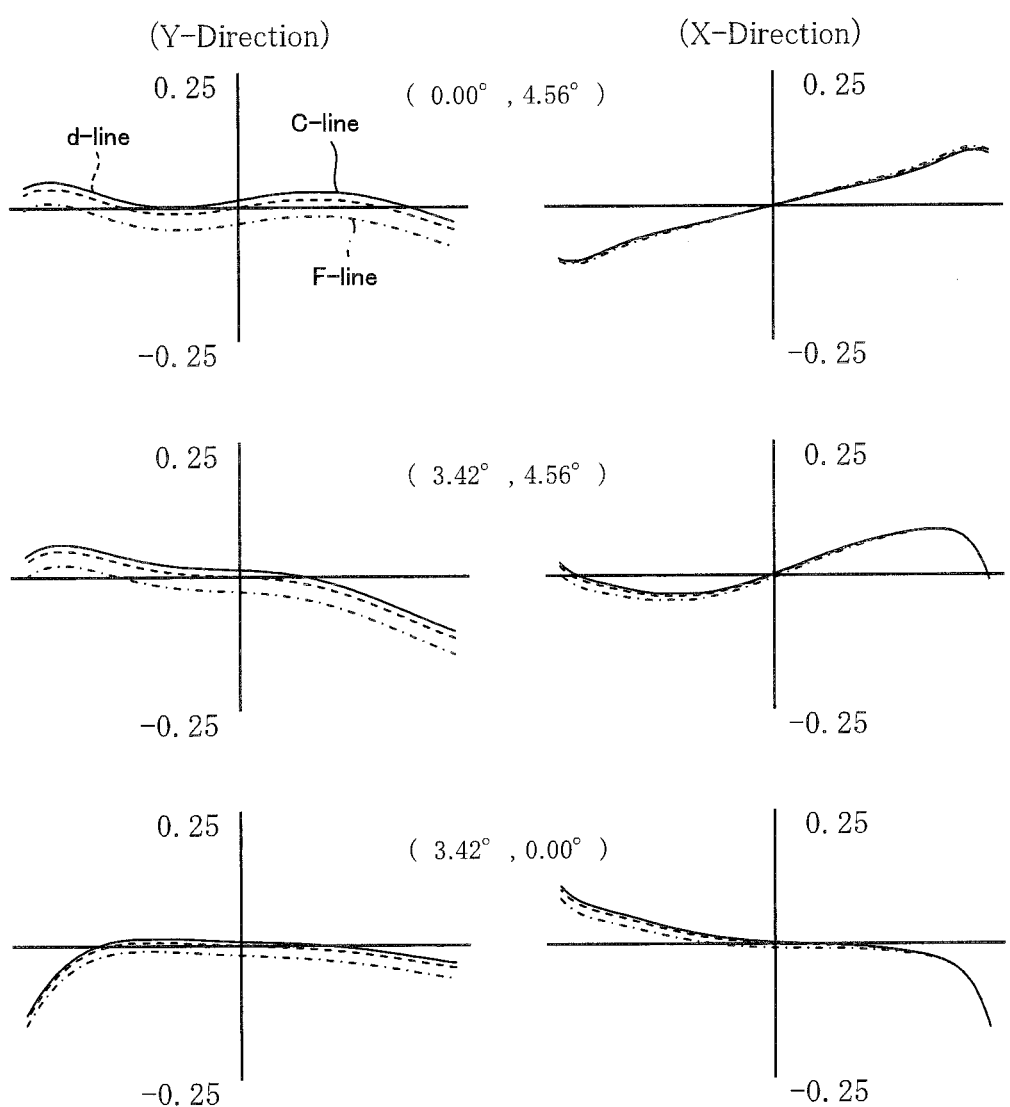
FIG. 21 is a transverse aberration diagram for the whole of the optical system of Example 3.

FIGS. 18 and 19 are illustrative in the Y-Z and X-Z sections of the image display apparatus P equipped with the prism optical system 1 of Example 3, respectively, and FIGS. 20 and 21 are transverse aberration diagrams for the whole optical system.

The image display apparatus P of Example 3 includes the prism optical system 1 and the image display device 2.

The prism optical system 1 is formed of three optical surfaces, each having an optical function. The 1st surface 11 is located in opposition to the image display device 2, and has a function of transmitting light once. The 2nd surface 12 is located in opposition to the image display device 2, but it faces away from the 1st surface 11 and has a function of internally reflecting light three times. The 3rd surface 13 is located in opposition to the image display device 2, but it faces away from the 2nd surface 12 and has a function of transmitting light once and internally reflecting light twice. There is also an exit pupil S provided near the transmitting surface face of the 3rd surface 13.

There are three free-form surfaces given as the rotationally asymmetric surfaces: 1st surface 11, 2nd surface 12, and 3rd surface 13.

Upon back ray tracing, a light beam leaving the exit pupil enters the prism optical system 1 through the 3rd surface, and is subjected to internal reflection at the 2nd surface 12, then internal reflection at the 3rd surface 13, then internal reflection at the 2nd surface 12, then internal reflection at the 3rd surface 13 and then internal reflection at the 2nd surface 12, leaving the prism optical system 1 through the 1st surface 11. A light beam leaving the prism optical system 1 enters the image display device 2.

Figure 22:
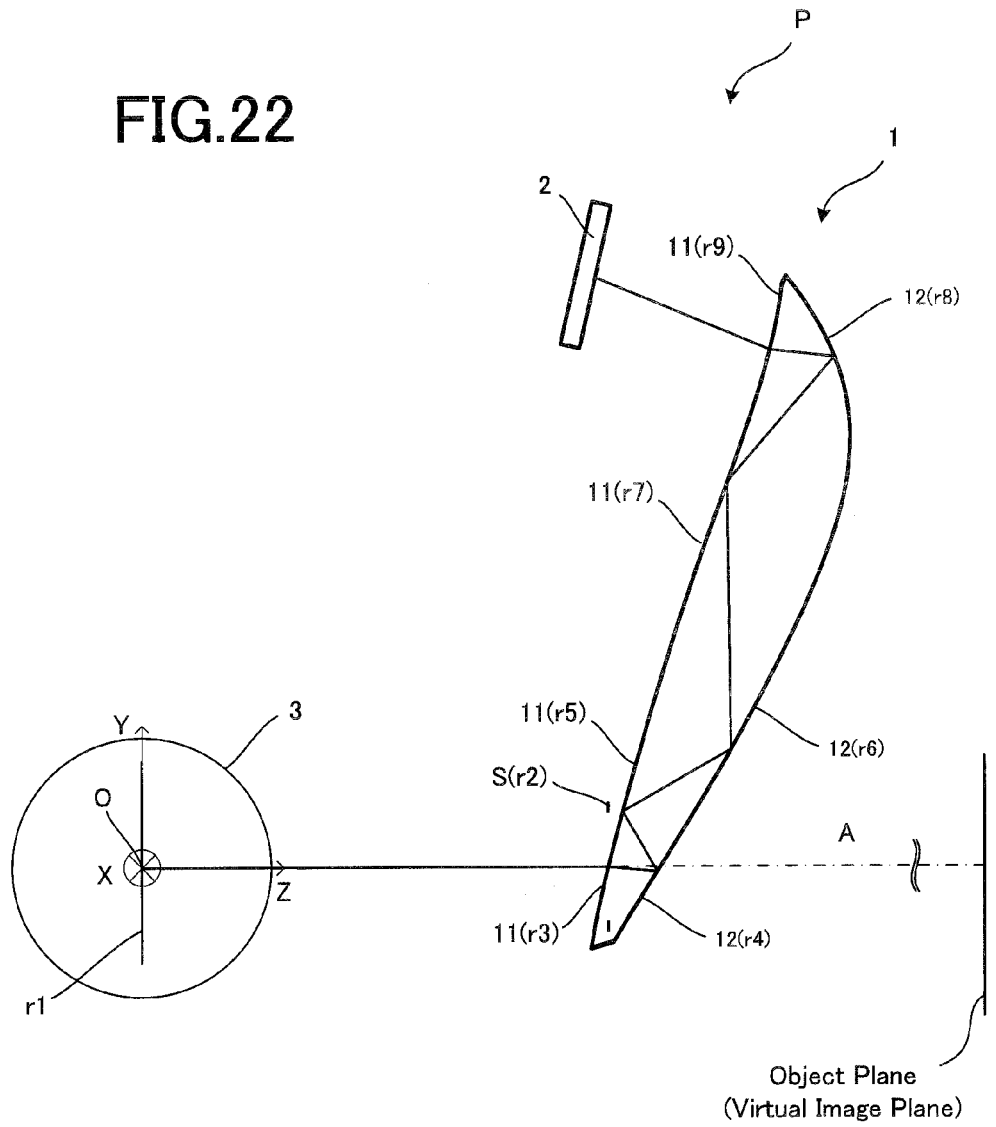
FIG. 22 is illustrative in construction of Example 4 of the viewing optical system.

FIG. 22 is illustrative in conception of the image display apparatus incorporating the prism 1 of Example 4.

As shown in FIG. 22, the image display apparatus P of Example 4 is built up of an image display device 2 for displaying an image and a viewing optical system 1 for projecting an image onto the viewer s eyeball. The viewing optical system 1 is a prism 1 that forms a part of eyeglasses. The prism 1 is made up of two surfaces and includes two rotationally asymmetric surfaces. Light leaving the image display device 2 is reflected odd-numbered times within the prism 1 before it is guided to the viewer s eyeball.

Figure 23:
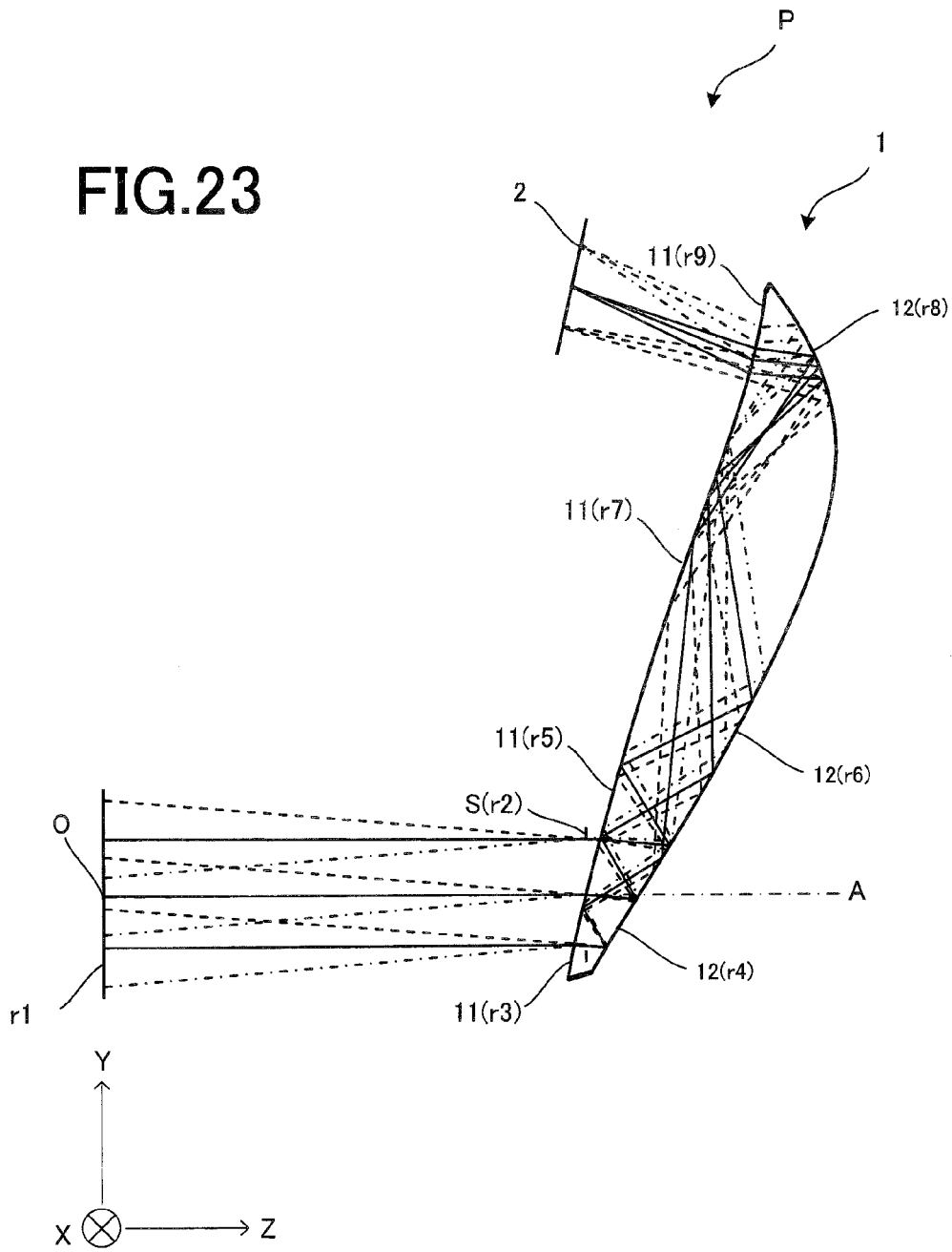
FIG. 23 is an optical path diagram in the Y-Z section of Example 4 of the viewing optical system.
Figure 24:
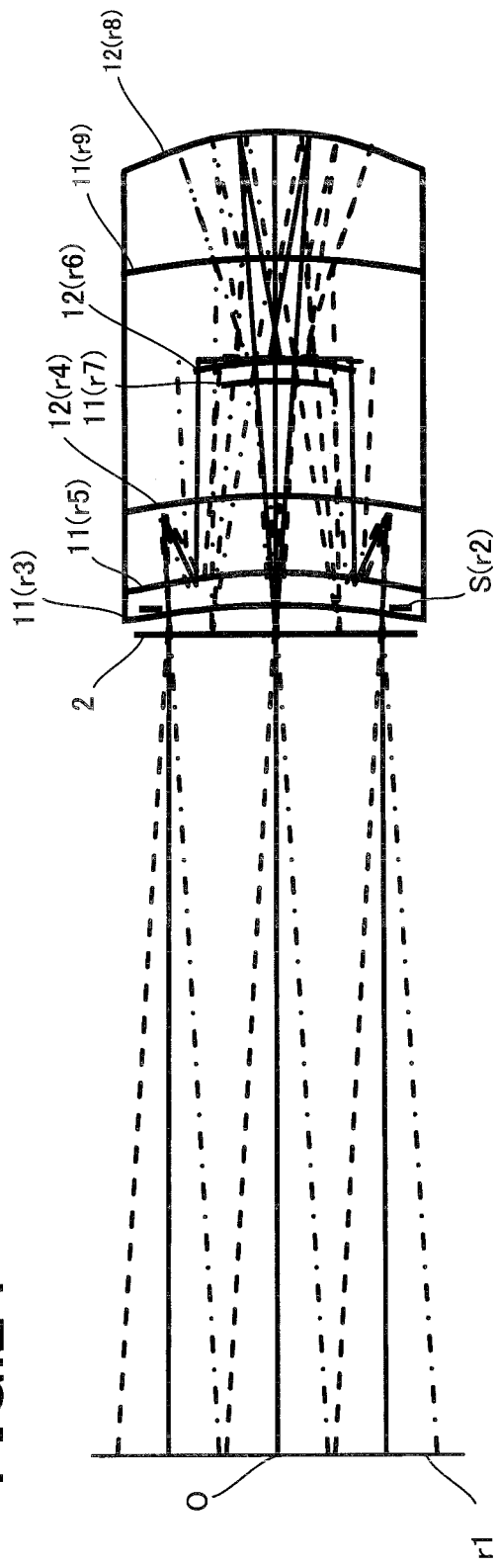
FIG. 24 is an optical path diagram in the X-Z section of Example 4 of the viewing optical system.
Figure 25:
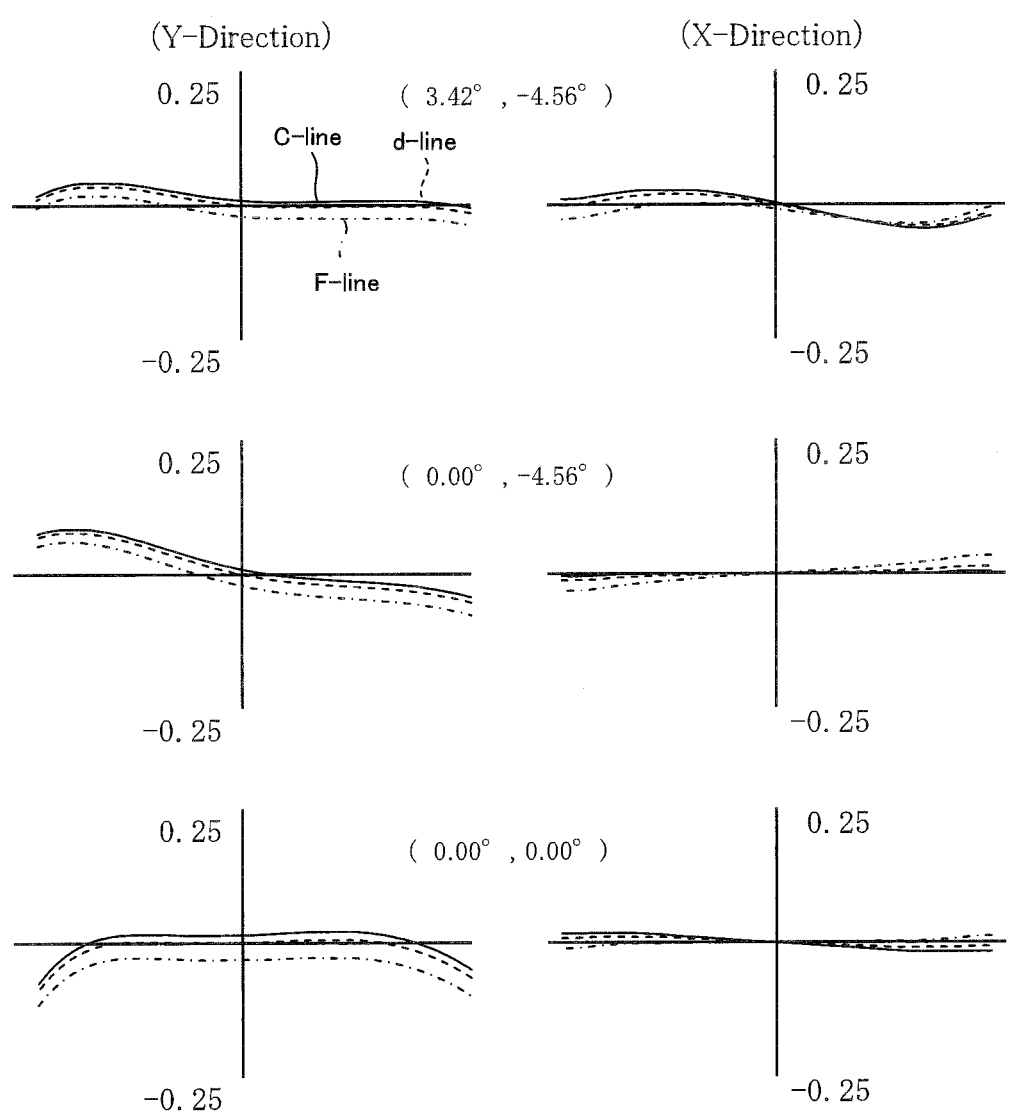
FIG. 25 is a transverse aberration diagram for the whole of the optical system of Example 4.
Figure 26:
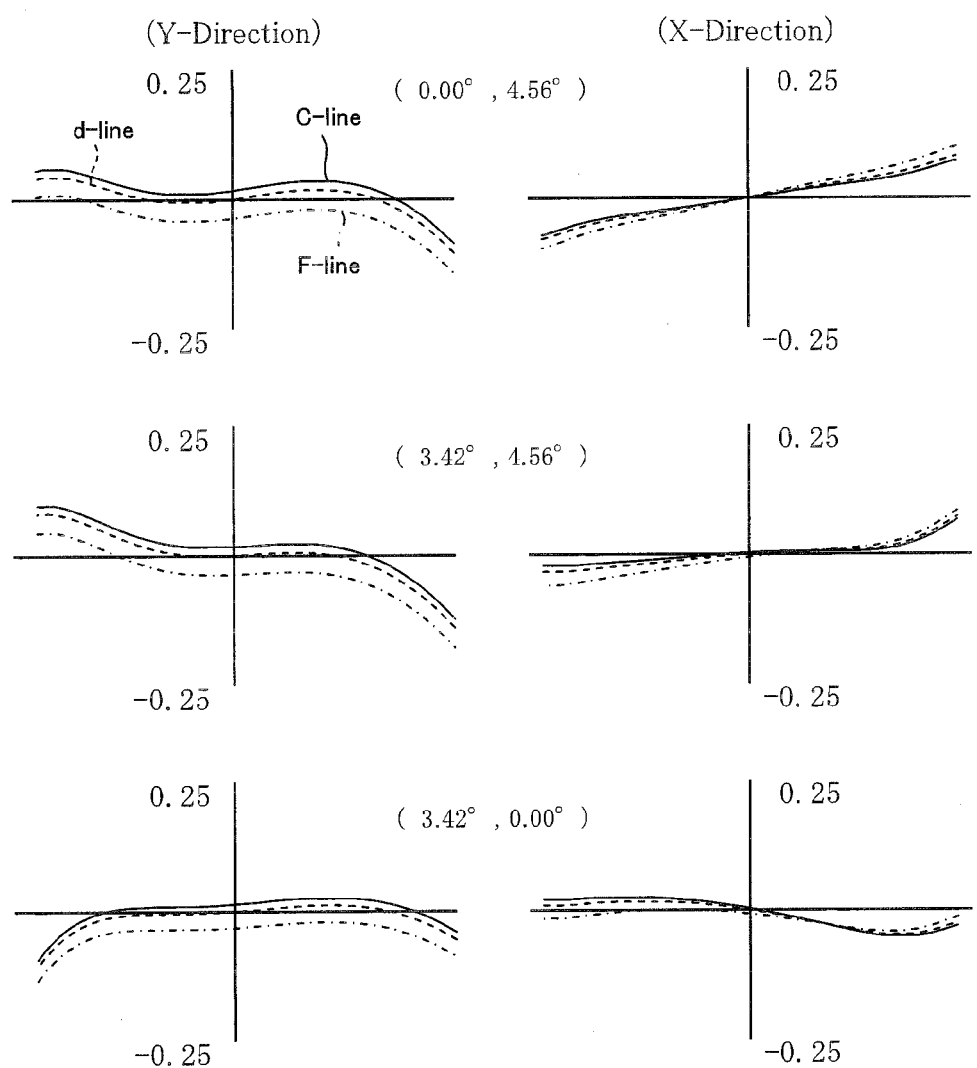
FIG. 26 is a transverse aberration diagram for the whole of the optical system of Example 4.

FIGS. 23 and 24 are illustrative in the Y-Z and X-Z sections of the image display apparatus P equipped with the prism optical system 1 of Example 4, respectively, and FIGS. 25 and 26 are transverse aberration diagrams for the whole optical system.

The image display apparatus P of Example 4 includes the prism optical system 1 and the image display device 2.

The prism optical system 1 is formed of two optical surfaces, each having an optical function. The 1st surface 11 is located in opposition to the image display device 2, and has a function of transmitting light twice and internally reflecting light twice. The 2nd surface 12 is located in opposition to the image display device 2, but it faces away from the 1st surface 11 and has a function of internally reflecting light three times. There is also an exit pupil S provided near the transmitting surface through which a light beam coming from the object plane of the 1st surface 11 transmits.

There are two free-form surfaces given as the rotationally asymmetric surfaces: 1st surface 11, and 2nd surface 12.

Upon ray back tracing, a light beam leaving the exit pupil enters the prism optical system 1 through the 1st surface 11, and is subjected to internal reflection at the 2nd surface 12, then internal reflection at the 1st surface 11, then internal reflection at the 2nd surface 12, then internal reflection at the 1st surface 11 and then internal reflection at the 2nd surface 12, leaving the prism optical system 1 through the 1st surface. A light beam leaving the prism optical system 1 enters the image display device 2. Set out below are the constituting parameters of Examples 1-4. Note here that the FFS in the following tables is indicative of the free-form surface.

Example 1

| Surface No. | Radius of Curvature | Surface Separation | Decentration | Refractive Index | Abbe Constant |
|---|---|---|---|---|---|
| Object Plane | ∞ | −1000.00 | | | |
| r1 (Dummy Surface) | ∞ | 0.00 | | | |
| r2 (Exit Pupil) | ∞ | 0.00 | Decentration (1) | | |
| r3 | FFS [1] | 0.00 | Decentration (2) | 1.5254 | 56.2 |
| r4 | FFS [2] | 0.00 | Decentration (3) | 1.5254 | 56.2 |
| r5 | FFS [1] | 0.00 | Decentration (2) | 1.5254 | 56.2 |
| r6 | FFS [3] | 0.00 | Decentration (4) | 1.5254 | 56.2 |
| r7 | FFS [1] | 0.00 | Decentration (2) | 1.5254 | 56.2 |
| r8 | FFS [4] | 0.00 | Decentration (5) | 1.5254 | 56.2 |

-continued

| | | | | | |
|---|---|---|---|---|---|
| r9 | FFS [5] | 0.00 | Decentration (6) | | |
| Image Plane | ∞ | 0.00 | Decentration (7) | | |

| FFS [1] | | | | | |
|---|---|---|---|---|---|
| C 4 | 1.088E−003 | C 6 | −5.718E−003 | C 8 | −2.729E−004 |
| C 10 | 1.762E−004 | C 11 | −5.057E−005 | C 13 | 4.190E−006 |
| C 15 | −3.474E−005 | C 17 | −8.264E−006 | C 19 | −1.217E−006 |
| C 21 | 1.883E−006 | C 22 | −1.446E−006 | C 24 | 7.462E−007 |
| C 26 | 3.155E−008 | C 28 | −3.487E−008 | | |

| FFS [2] | | | | | |
|---|---|---|---|---|---|
| C 4 | −7.189E−003 | C 6 | −5.584E−003 | C 8 | −1.761E−004 |
| C 10 | −1.127E−004 | C 11 | −3.659E−005 | C 13 | 7.966E−006 |
| C 15 | 2.689E−007 | | | | |

| FFS [3] | | | | | |
|---|---|---|---|---|---|
| C 4 | 7.890E−003 | C 6 | −1.030E−002 | C 8 | −7.428E−005 |
| C 10 | 6.409E−006 | C 11 | 7.616E−005 | C 13 | 1.487E−005 |
| C 15 | −1.450E−005 | C 17 | −4.131E−007 | C 19 | −9.396E−007 |
| C 21 | 2.538E−007 | | | | |

| FFS [4] | | | | | |
|---|---|---|---|---|---|
| C 4 | −8.047E−003 | C 6 | −6.341E−004 | C 8 | −1.116E−003 |
| C 10 | −2.146E−005 | C 11 | −3.318E−004 | C 13 | −5.037E−005 |
| C 15 | 1.909E−005 | | | | |

| FFS [5] | | | | | |
|---|---|---|---|---|---|
| C 4 | 2.450E−002 | C 6 | −7.855E−003 | C 8 | −3.415E−003 |
| C 10 | −3.106E−004 | C 11 | −2.479E−003 | C 13 | −4.335E−004 |
| C 15 | 4.757E−004 | | | | |

| Decentration [1] | | | | | |
|---|---|---|---|---|---|
| X | 0.00 | Y | 0.00 | Z | 20.01 |
| α | 0.00 | β | 0.00 | γ | 0.00 |

| Decentration [2] | | | | | |
|---|---|---|---|---|---|
| X | 0.00 | Y | 1.15 | Z | 20.14 |
| α | −5.50 | β | 0.00 | γ | 0.00 |

| Decentration [3] | | | | | |
|---|---|---|---|---|---|
| X | 0.00 | Y | 0.10 | Z | 23.65 |
| α | −31.12 | β | 0.00 | γ | 0.00 |

| Decentration [4] | | | | | |
|---|---|---|---|---|---|
| X | 0.00 | Y | 10.01 | Z | 25.85 |
| α | 0.53 | β | 0.00 | γ | 0.00 |

| Decentration [5] | | | | | |
|---|---|---|---|---|---|
| X | 0.00 | Y | 25.69 | Z | 23.00 |
| α | 20.69 | β | 0.00 | γ | 0.00 |

| Decentration [6] | | | | | |
|---|---|---|---|---|---|
| X | 0.00 | Y | 27.79 | Z | 18.00 |
| α | −23.66 | β | 0.00 | γ | 0.00 |

| Decentration [7] | | | | | |
|---|---|---|---|---|---|
| X | 0.00 | Y | 31.01 | Z | 10.04 |
| α | −22.00 | β | 0.00 | γ | 0.00 |

Example 2

| Surface No. | Radius of Curvature | Surface Separation | Decentration | Refractive Index | Abbe Constant |
|---|---|---|---|---|---|
| Object Plane | ∞ | −1000.00 | | | |
| r1 (Dummy Surface) | ∞ | 0.00 | | | |
| r2 (Exit Pupil) | ∞ | 0.00 | Decentration (1) | | |
| r3 | FFS [1] | 0.00 | Decentration (2) | 1.5254 | 56.2 |
| r4 | FFS [2] | 0.00 | Decentration (3) | 1.5254 | 56.2 |
| r5 | FFS [1] | 0.00 | Decentration (2) | 1.5254 | 56.2 |
| r6 | FFS [3] | 0.00 | Decentration (4) | 1.5254 | 56.2 |
| r7 | FFS [1] | 0.00 | Decentration (2) | 1.5254 | 56.2 |
| r8 | FFS [3] | 0.00 | Decentration (4) | 1.5254 | 56.2 |
| r9 | FFS [4] | 0.00 | Decentration (5) | | |
| Image Plane | ∞ | 0.00 | Decentration (6) | | |

FFS [1]

| | | | | | |
|---|---|---|---|---|---|
| C 4 | 6.402E−004 | C 6 | −6.128E−003 | C 8 | −4.180E−004 |
| C 10 | 1.481E−004 | C 11 | −1.265E−004 | C 13 | −3.191E−006 |
| C 15 | −3.615E−005 | C 17 | −2.987E−005 | C 19 | −1.416E−006 |
| C 21 | 1.835E−006 | C 22 | −2.344E−006 | C 24 | 1.589E−006 |
| C 26 | −2.149E−009 | C 28 | −3.604E−008 | | |

FFS [2]

| | | | | | |
|---|---|---|---|---|---|
| C 4 | −7.740E−003 | C 6 | −8.267E−003 | C 8 | −2.655E−004 |
| C 10 | −1.101E−004 | C 11 | −9.852E−005 | C 13 | −3.129E−006 |
| C 15 | 2.689E−007 | | | | |

FFS [3]

| | | | | | |
|---|---|---|---|---|---|
| C 4 | 3.446E−003 | C 6 | −9.360E−003 | C 8 | −6.945E−004 |
| C 10 | −7.879E−005 | C 11 | −2.149E−004 | C 13 | 1.145E−005 |
| C 15 | −1.478E−005 | C 17 | −1.040E−006 | C 19 | −1.398E−006 |
| C 21 | 4.4022E−007 | | | | |

FFS [4]

| | | | | | |
|---|---|---|---|---|---|
| C 4 | 2.431E−002 | C 6 | −4.411E−002 | C 8 | −2.427E−003 |
| C 10 | 7.360E−003 | C 11 | −4.808E−003 | C 13 | 2.438E−004 |
| C 15 | −1.651E−003 | | | | |

Decentration [1]

| | | | | | |
|---|---|---|---|---|---|
| X | 0.00 | Y | 0.00 | Z | 20.00 |
| α | 0.00 | β | 0.00 | γ | 0.00 |

Decentration [2]

| | | | | | |
|---|---|---|---|---|---|
| X | 0.00 | Y | −2.34 | Z | 19.81 |
| α | −5.50 | β | 0.00 | γ | 0.00 |

Decentration [3]

| | | | | | |
|---|---|---|---|---|---|
| X | 0.00 | Y | −3.66 | Z | 21.92 |
| α | −30.32 | β | 0.00 | γ | 0.00 |

Decentration [4]

| | | | | | |
|---|---|---|---|---|---|
| X | 0.00 | Y | 6.42 | Z | 26.23 |
| α | 0.54 | β | 0.00 | γ | 0.00 |

Decentration [5]

| | | | | | |
|---|---|---|---|---|---|
| X | 0.00 | Y | 26.07 | Z | 17.62 |
| α | 3.18 | β | 0.00 | γ | 0.00 |

Decentration [6]

| | | | | | |
|---|---|---|---|---|---|
| X | 0.00 | Y | 27.24 | Z | 14.42 |
| α | −20.00 | β | 0.00 | γ | 0.00 |

Example 3

| Surface No. | Radius of Curvature | Surface Separation | Decentration | Refractive Index | Abbe Constant |
|---|---|---|---|---|---|
| Object Plane | ∞ | −1000.00 | | | |
| r1 (Dummy Surface) | ∞ | 0.00 | | | |
| r2 (Exit Pupil) | ∞ | 0.00 | Decentration (1) | | |
| r3 | FFS [1] | 0.00 | Decentration (2) | 1.5254 | 56.2 |
| r4 | FFS [2] | 0.00 | Decentration (3) | 1.5254 | 56.2 |
| r5 | FFS [1] | 0.00 | Decentration (2) | 1.5254 | 56.2 |
| r6 | FFS [2] | 0.00 | Decentration (3) | 1.5254 | 56.2 |
| r7 | FFS [1] | 0.00 | Decentration (2) | 1.5254 | 56.2 |
| r8 | FFS [2] | 0.00 | Decentration (3) | 1.5254 | 56.2 |
| r9 | FFS [3] | 0.00 | Decentration (4) | | |
| Image Plane | ∞ | 0.00 | Decentration (5) | | |

FFS [1]

| | | | | | |
|---|---|---|---|---|---|
| C 4 | −1.217E−002 | C 6 | 5.572E−003 | C 8 | −1.257E−003 |
| C 10 | −3.312E−005 | C 11 | 1.245E−004 | C 13 | −1.277E−004 |
| C 15 | −6.142E−006 | C 17 | 6.123E−005 | C 19 | −2.452E−006 |
| C 21 | 1.608E−007 | C 22 | 3.857E−005 | C 24 | 1.679E−006 |
| C 26 | 6.144E−008 | C 28 | 1.729E−008 | | |

FFS [2]

| | | | | | |
|---|---|---|---|---|---|
| C 4 | −2.035E−002 | C 6 | −1.492E−002 | C 8 | −1.879E−003 |
| C 10 | −9.249E−004 | C 11 | −2.082E−004 | C 13 | −1.320E−004 |
| C 15 | −3.946E−005 | C 17 | −8.566E−006 | C 19 | −2.398E−006 |
| C 21 | −7.783E−007 | C 22 | 1.605E−005 | C 24 | −3.599E−007 |
| C 26 | 8.955E−009 | C 28 | −3.586E−009 | | |

FFS [3]

| | | | | | |
|---|---|---|---|---|---|
| C 4 | −2.463E−002 | C 6 | −7.680E−003 | C 8 | −1.859E−003 |
| C 10 | −1.639E−003 | C 11 | −3.787E−004 | C 13 | −6.549E−004 |
| C 15 | −9.815E−004 | C 17 | 7.054E−006 | C 19 | −1.161E−003 |
| C 21 | 1.416E−004 | C 22 | 1.524E−004 | C 24 | −9.199E−005 |
| C 26 | −1.939E−004 | C 28 | 4.349E−005 | | |

Decentration [1]

| | | | | | |
|---|---|---|---|---|---|
| X | 0.00 | Y | 0.00 | Z | 20.00 |
| α | 0.00 | β | 0.00 | γ | 0.00 |

Decentration [2]

| | | | | | |
|---|---|---|---|---|---|
| X | 0.00 | Y | 13.83 | Z | 22.99 |
| α | −16.26 | β | 0.00 | γ | 0.00 |

Decentration [3]

| | | | | | |
|---|---|---|---|---|---|
| X | 0.00 | Y | 19.46 | Z | 32.03 |
| α | −17.89 | β | 0.00 | γ | 0.00 |

Decentration [4]

| | | | | | |
|---|---|---|---|---|---|
| X | 0.00 | Y | 31.27 | Z | 27.97 |
| α | −10.20 | β | 0.00 | γ | 0.00 |

Decentration [5]

| | | | | | |
|---|---|---|---|---|---|
| X | 0.00 | Y | 34.18 | Z | 14.79 |
| α | −12.15 | β | 0.00 | γ | 0.00 |

Example 4

| Surface No. | Radius of Curvature | Surface Separation | Decentration | Refractive Index | Abbe Constant |
|---|---|---|---|---|---|
| Object Plane | ∞ | −1000.00 | | | |
| r1 (Dummy Surface) | ∞ | 0.00 | | | |
| r2 (Exit Pupil) | ∞ | 0.00 | Decentration (1) | | |
| r3 | FFS [1] | 0.00 | Decentration (2) | 1.5254 | 56.2 |
| r4 | FFS [2] | 0.00 | Decentration (3) | 1.5254 | 56.2 |
| r5 | FFS [1] | 0.00 | Decentration (2) | 1.5254 | 56.2 |
| r6 | FFS [2] | 0.00 | Decentration (3) | 1.5254 | 56.2 |
| r7 | FFS [1] | 0.00 | Decentration (2) | 1.5254 | 56.2 |
| r8 | FFS [2] | 0.00 | Decentration (3) | 1.5254 | 56.2 |
| r9 | FFS [1] | 0.00 | Decentration (2) | 1.5254 | 56.2 |
| Image Plane | ∞ | 0.00 | Decentration (4) | | |

FFS [1]

| | | | | | |
|---|---|---|---|---|---|
| C 4 | −4.0970E−002 | C 6 | 2.7969E−003 | C 8 | −1.0205E−003 |
| C 10 | 2.8522E−005 | C 11 | −6.1587E−004 | C 13 | −3.3550E−005 |
| C 15 | −4.3240E−006 | C 17 | 3.4620E−006 | C 19 | 2.1932E−007 |
| C 21 | −2.2260E−007 | C 22 | 3.3575E−005 | C 24 | 1.0425E−006 |
| C 26 | 2.2978E−007 | C 28 | 2.8734E−009 | | |

FFS [2]

| | | | | | |
|---|---|---|---|---|---|
| C 4 | −2.8543E−002 | C 6 | −1.5540E−002 | C 8 | −1.8607E−003 |
| C 10 | −9.1234E−004 | C 11 | −3.4620E−004 | C 13 | −1.5937E−004 |
| C 15 | −3.9451E−005 | C 17 | −8.2317E−006 | C 19 | −2.0284E−006 |
| C 21 | −7.8205E−007 | C 22 | 8.4069E−006 | C 24 | 1.6411E−009 |
| C 26 | 7.8585E−008 | C 28 | −3.6558E−009 | | |

Decentration [1]

| | | | | | | | |
|---|---|---|---|---|---|---|---|
| X | 0.00 | Y | 0.00 | Z | 20.00 | | |
| α | 0.00 | β | 0.00 | γ | 0.00 | | |

Decentration [2]

| | | | | | |
|---|---|---|---|---|---|
| X | 0.00 | Y | 13.35 | Z | 23.84 |
| α | −17.83 | β | 0.00 | γ | 0.00 |

Decentration [3]

| | | | | | |
|---|---|---|---|---|---|
| X | 0.00 | Y | 19.19 | Z | 33.24 |
| α | −19.17 | β | 0.00 | γ | 0.00 |

Decentration [4]

| | | | | | |
|---|---|---|---|---|---|
| X | 0.00 | Y | 34.85 | Z | 19.26 |
| α | −12.57 | β | 0.00 | γ | 0.00 |

What is claimed is:

1. An image display apparatus, comprising:
   an image display device for displaying an image, and
   a viewing optical system for projecting the image onto the viewer s eyeball, wherein:
   the viewing optical system is a prism that forms a part of eyeglasses, wherein the prism is made up of at least two surfaces and includes at least two rotationally asymmetric surfaces, and
   light leaving the image display device is reflected odd-numbered times within the prism before it is guided to the viewer s eyeball.

2. The image display apparatus according to claim 1, wherein of the at least two rotationally asymmetric surfaces, a first surface is located at a position in proximity to the viewer upon viewing, and a second surface is located outside the viewer upon viewing.

3. The image display apparatus according to claim 1, wherein the second surface located outside the viewer upon viewing has positive power in a Y-Z plane.

4. The image display apparatus according to claim 1, wherein an exit surface of the viewing optical system for the viewer s eyeball is configured along a bottom surface of an eyeglasses lens.

5. The image display apparatus according to claim 1, wherein light coming from the image display device is reflected five times within the prism in the viewing optical system before it leaves the prism and arrives at the viewer s eyeball.

6. The image display apparatus according to claim 1, wherein the viewing optical system is a prism made up of at least two optical surfaces.

7. The image display apparatus according to claim 1, wherein the viewing optical system is a prism made up of at least three optical surfaces.

8. The image display apparatus according to claim 1, wherein the viewing optical system is a prism made up of at least four optical surfaces.

9. The image display apparatus according to claim 1, wherein the viewing optical system forms a primary image inside the prism, and the primary image is in turn guided to the viewer s eyeball.

10. The image display apparatus according to claim 1, wherein in the viewing optical system, an exit pupil is formed near an exit surface of the prism or between the exit surface and the viewer s eyeball.

11. The image display apparatus according to claim 1, wherein the viewing optical system is located in such a way as to form a part of an eyeglasses frame.

12. The image display apparatus according to claim 1, wherein the image display device is located at an end face of an eyeglasses temple segment, and is in opposition to an entrance surface for capturing an image out of the viewing optical system.

\* \* \* \* \*